United States Patent
Yerramalli et al.

(10) Patent No.: US 10,659,102 B2
(45) Date of Patent: May 19, 2020

(54) SYNCHRONIZATION TECHNIQUES USING FREQUENCY HOPPING IN UNLICENSED RADIO FREQUENCY SPECTRUM

(71) Applicant: QUALCOMM Incorporated, San Diego, CA (US)

(72) Inventors: Srinivas Yerramalli, San Diego, CA (US); Chih-Hao Liu, San Diego, CA (US); Tamer Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/884,161

(22) Filed: Jan. 30, 2018

(65) Prior Publication Data

US 2018/0227011 A1 Aug. 9, 2018

Related U.S. Application Data

(60) Provisional application No. 62/454,773, filed on Feb. 4, 2017.

(51) Int. Cl.
*H04B 1/7156* (2011.01)
*H04B 1/7083* (2011.01)
(Continued)

(52) U.S. Cl.
CPC ......... *H04B 1/7156* (2013.01); *H04B 1/7083* (2013.01); *H04B 1/7087* (2013.01);
(Continued)

(58) Field of Classification Search
CPC .. H04W 56/00; H04W 56/001; H04B 1/7156; H04B 1/7083; H04B 2001/71563; H04B 1/7143; H04B 1/7087
See application file for complete search history.

(56) References Cited

U.S. PATENT DOCUMENTS 9,537,642 B2 * 1/2017 Belghoul ............ H04W 28/085
2017/0325184 A1 * 11/2017 Kwan ................. H04W 56/001

FOREIGN PATENT DOCUMENTS

WO  WO-2015115977 A1  8/2015

OTHER PUBLICATIONS

Kyocera, "Further Considerations on the Essential Functionalities for LAA," 3GPP Draft; R1-144955, 3rd Generation Partnership Project (3GPP), Mobile Competence Centre; 650, Route Des Lucioles; F-06921 Sophia-Anti Polls Cedex; France, vol. RAN WG1, No. San Francisco, Nov. 17, 2014-Nov. 21, 2014, Nov. 8, 2014, XP050895108, Retrieved from the Internet: http://www.3gpp.org/ftp/tsg_ran/WG1_RL1/TSGR1_79/Docs/R1-144955.zip (accessed Oct. 27, 2017), 10 pages.

(Continued)

*Primary Examiner* — David S Huang
(74) *Attorney, Agent, or Firm* — Holland & Hart LLP

(57) ABSTRACT

Described techniques provide for transmission of synchronization signals using frequency hopping across a number of hopping frequencies in unlicensed or shared radio frequency spectrum. A base station may identify a set of hop frequencies for transmitting synchronization signals, and transmit synchronization signals using a hopping pattern over the hop frequencies. A user equipment (UE) seeking to identify the base station may monitor one or more of the hop frequencies to identify one or more synchronization signals on the hop frequency. A system timing may be identified in some cases, and one or more base station IDs may be identified. In some cases, a hop frequency may be monitored for a duration that may span the transmission of two or more synchronization signals of a particular base station, based on a periodicity of synchronization signal transmissions on each hop frequency.

20 Claims, 21 Drawing Sheets

(51) Int. Cl.
*H04B 1/7087* (2011.01)
*H04B 1/7143* (2011.01)
*H04B 1/713* (2011.01)
*H04J 11/00* (2006.01)

(52) U.S. Cl.
CPC .......... *H04B 1/713* (2013.01); *H04B 1/7143* (2013.01); *H04J 11/0069* (2013.01); *H04B 2001/71563* (2013.01)

(56) References Cited

OTHER PUBLICATIONS

3GPP TR 38.802, "3rd Generation Partnership Project; Technical Specification Group Radio Access Network; Study on New Radio (NR) Access Technology Physical Layer Aspects," Release 14, 3rd Generation Partnership Project (3GPP), Mobile Competence Centre; 650, Route Des Lucioles; F-06921 Sophia-Antipolis Cedex; France, vol. RAN WG1, No. V1.1.0, Feb. 3, 2017, XP051230711, pp. 1-71, [retrieved on Feb. 3, 2017].
International Search Report and Written Opinion—PCT/US2018/016268—ISA/EPO—dated May 28, 2018.

\* cited by examiner

SYNCHRONIZATION TECHNIQUES USING FREQUENCY HOPPING IN UNLICENSED RADIO FREQUENCY SPECTRUM

CROSS REFERENCES

The present Application for Patent claims priority to U.S. Provisional Patent Application No. 62/454,773 by Yerramalli, et al., entitled "Synchronization Techniques Using Frequency Hopping In Unlicensed Radio Frequency Spectrum," filed Feb. 4, 2017, assigned to the assignee hereof.

BACKGROUND

The following relates generally to wireless communication, and more specifically to synchronization techniques using frequency hopping in unlicensed radio frequency spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

SUMMARY

The described techniques relate to improved methods, systems, devices, or apparatuses that support synchronization techniques using frequency hopping in unlicensed radio frequency spectrum. Generally, the described techniques provide for transmission of synchronization signals using frequency hopping across a number of hopping frequencies in unlicensed or shared radio frequency spectrum. A base station may identify a set of hop frequencies for transmitting synchronization signals, and transmit synchronization signals using a hopping pattern over the hop frequencies. A user equipment (UE) seeking to identify the base station may monitor one or more of the hop frequencies to identify one or more synchronization signals on the hop frequency. A system timing may be identified in some cases, and one or more base station identities (IDs) may be identified. In some cases, a hop frequency may be monitored for a duration that may span the transmission of two or more synchronization signals of a particular base station, based on a periodicity of synchronization signal transmissions on each hop frequency. In some cases, the synchronization signals may be transmitted without performing a listen-before-talk (LBT) routine prior to starting transmission on the shared radio frequency spectrum.

A method of wireless communication is described. The method may include receiving, on a first hop frequency of a plurality of available hop frequencies in an unlicensed radio frequency spectrum band, two or more synchronization signals from a first base station, identifying a first synchronization signal of the first base station based at least in part on the received two or more synchronization signals, and receiving, on the first hop frequency, a second synchronization signal of the first base station based at least in part on a periodicity of synchronization signal transmissions on one or more hop frequencies of the plurality of available hop frequencies.

An apparatus for wireless communication is described. The apparatus may include means for receiving, on a first hop frequency of a plurality of available hop frequencies in an unlicensed radio frequency spectrum band, two or more synchronization signals from a first base station, means for identifying a first synchronization signal of the first base station based at least in part on the received two or more synchronization signals, and means for receiving, on the first hop frequency, a second synchronization signal of the first base station based at least in part on a periodicity of synchronization signal transmissions on one or more hop frequencies of the plurality of available hop frequencies.

Another apparatus for wireless communication is described. The apparatus may include a processor, memory in electronic communication with the processor, and instructions stored in the memory. The instructions may be operable to cause the processor to receive, on a first hop frequency of a plurality of available hop frequencies in an unlicensed radio frequency spectrum band, two or more synchronization signals from a first base station, identify a first synchronization signal of the first base station based at least in part on the received two or more synchronization signals, and receive, on the first hop frequency, a second synchronization signal of the first base station based at least in part on a periodicity of synchronization signal transmissions on one or more hop frequencies of the plurality of available hop frequencies.

A non-transitory computer readable medium for wireless communication is described. The non-transitory computer-readable medium may include instructions operable to cause a processor to receive, on a first hop frequency of a plurality of available hop frequencies in an unlicensed radio frequency spectrum band, two or more synchronization signals from a first base station, identify a first synchronization signal of the first base station based at least in part on the received two or more synchronization signals, and receive, on the first hop frequency, a second synchronization signal of the first base station based at least in part on a periodicity of synchronization signal transmissions on one or more hop frequencies of the plurality of available hop frequencies.

Some examples of the method, apparatus, and non-transitory computer-readable medium described above may further include processes, features, means, or instructions for identifying a third synchronization signal of a second base station based at least in part on the received two or more synchronization signals, and determining a system timing based at least in part on the first synchronization signal and the third synchronization signal.

Some examples of the method, apparatus, and non-transitory computer-readable medium described above may further include processes, features, means, or instructions for identifying the periodicity of synchronization signal transmissions based on a duty cycle for synchronization signal transmissions on at least a subset of the plurality of available hop frequencies.

In some examples of the method, apparatus, and non-transitory computer-readable medium described above, the at least the subset of the plurality of available hop frequencies comprise a first subset of identified hop frequencies of the plurality of available hop frequencies. In some examples of the method, apparatus, and non-transitory computer-readable medium described above, the first subset of identified hop frequencies comprise a static list of hop frequencies. In some examples of the method, apparatus, and non-transitory computer-readable medium described above, the first subset of identified hop frequencies may be identified center frequencies of a raster (e.g., a list) of center frequencies of the plurality of available hop frequencies.

Some examples of the method, apparatus, and non-transitory computer-readable medium described above may further include processes, features, means, or instructions for identifying a hopping pattern of the first base station based at least in part on the received first synchronization signal and/or a physical channel signal of the first base station. In some examples of the method, apparatus, and non-transitory computer-readable medium described above, the hopping pattern may be identified based at least in part on a number of hop frequencies of the plurality of available hop frequencies and a duration of transmissions of the first base station on each of the plurality of available hop frequencies. In some examples of the method, apparatus, and non-transitory computer-readable medium described above, the number of hop frequencies may be determined based at least in part on one or more of a configured bandwidth of the unlicensed radio frequency spectrum band and/or a signaled raster (e.g., a list) of hop frequencies from a base station. In some examples of the method, apparatus, and non-transitory computer-readable medium described above, the periodicity of synchronization signal transmissions on the first hop frequency may be determined based at least in part on the number of hop frequencies and the duration of transmissions.

A method of wireless communication is described. The method may include identifying a set of hop frequencies in an unlicensed radio frequency spectrum band for transmitting synchronization signals, identifying a hopping pattern for transmitting synchronization signals on each hop frequency of the set of hop frequencies, and transmitting the synchronization signals on each hop frequency of the set of hop frequencies according to the hopping pattern.

An apparatus for wireless communication is described. The apparatus may include means for identifying a set of hop frequencies in an unlicensed radio frequency spectrum band for transmitting synchronization signals, means for identifying a hopping pattern for transmitting synchronization signals on each hop frequency of the set of hop frequencies, and means for transmitting the synchronization signals on each hop frequency of the set of hop frequencies according to the hopping pattern.

Another apparatus for wireless communication is described. The apparatus may include a processor, memory in electronic communication with the processor, and instructions stored in the memory. The instructions may be operable to cause the processor to identify a set of hop frequencies in an unlicensed radio frequency spectrum band for transmitting synchronization signals, identify a hopping pattern for transmitting synchronization signals on each hop frequency of the set of hop frequencies, and transmit the synchronization signals on each hop frequency of the set of hop frequencies according to the hopping pattern.

A non-transitory computer readable medium for wireless communication is described. The non-transitory computer-readable medium may include instructions operable to cause a processor to identify a set of hop frequencies in an unlicensed radio frequency spectrum band for transmitting synchronization signals, identify a hopping pattern for transmitting synchronization signals on each hop frequency of the set of hop frequencies, and transmit the synchronization signals on each hop frequency of the set of hop frequencies according to the hopping pattern.

Some examples of the method, apparatus, and non-transitory computer-readable medium described above may further include processes, features, means, or instructions for identifying transmission duration for each hop frequency of the set of hop frequencies, and wherein a duty cycle of synchronization signal transmissions of each hop frequency of the set of hop frequencies corresponds to a product of a number of hop frequencies in the set of hop frequencies and the transmission duration.

Some examples of the method, apparatus, and non-transitory computer-readable medium described above may further include processes, features, means, or instructions for identifying a location of the synchronization signals within the transmission duration based at least in part on the number of hop frequencies in the set of hop frequencies and a number of base stations transmitting synchronization signals using the set of hop frequencies.

In some examples of the method, apparatus, and non-transitory computer-readable medium described above, the set of hop frequencies may be a subset of a plurality of available hop frequencies in the unlicensed radio frequency spectrum band. In some examples of the method, apparatus, and non-transitory computer-readable medium described above, the set of hop frequencies may be identified center frequencies of a raster (e.g., a list) of center frequencies of the plurality of available hop frequencies.

In some examples of the method, apparatus, and non-transitory computer-readable medium described above, the identifying the hopping pattern comprises generating a sequence of hop frequencies of the set of hop frequencies. The sequence of hop frequencies may include a randomized permutation sequence of the set of hop frequencies. In some examples of the method, apparatus, and non-transitory computer-readable medium described above, the identifying the hopping pattern comprises generating a sequence of consecutive hop frequencies of the set of hop frequencies. In some examples of the method, apparatus, and non-transitory computer-readable medium described above, the identifying the hopping pattern comprises generating a permutation sequence of hop frequencies of the set of hop frequencies. In some examples of the method, apparatus, and non-transitory computer-readable medium described above, the transmitting the synchronization signals may be performed in an absence of performing a LBT procedure on one or more hop frequencies of the set of hop frequencies.

Some examples of the method, apparatus, and non-transitory computer-readable medium described above may further include processes, features, means, or instructions for establishing a connection with a UE, and configuring the UE with the set of hop frequencies and the hopping pattern.

DETAILED DESCRIPTION

Figure 1:
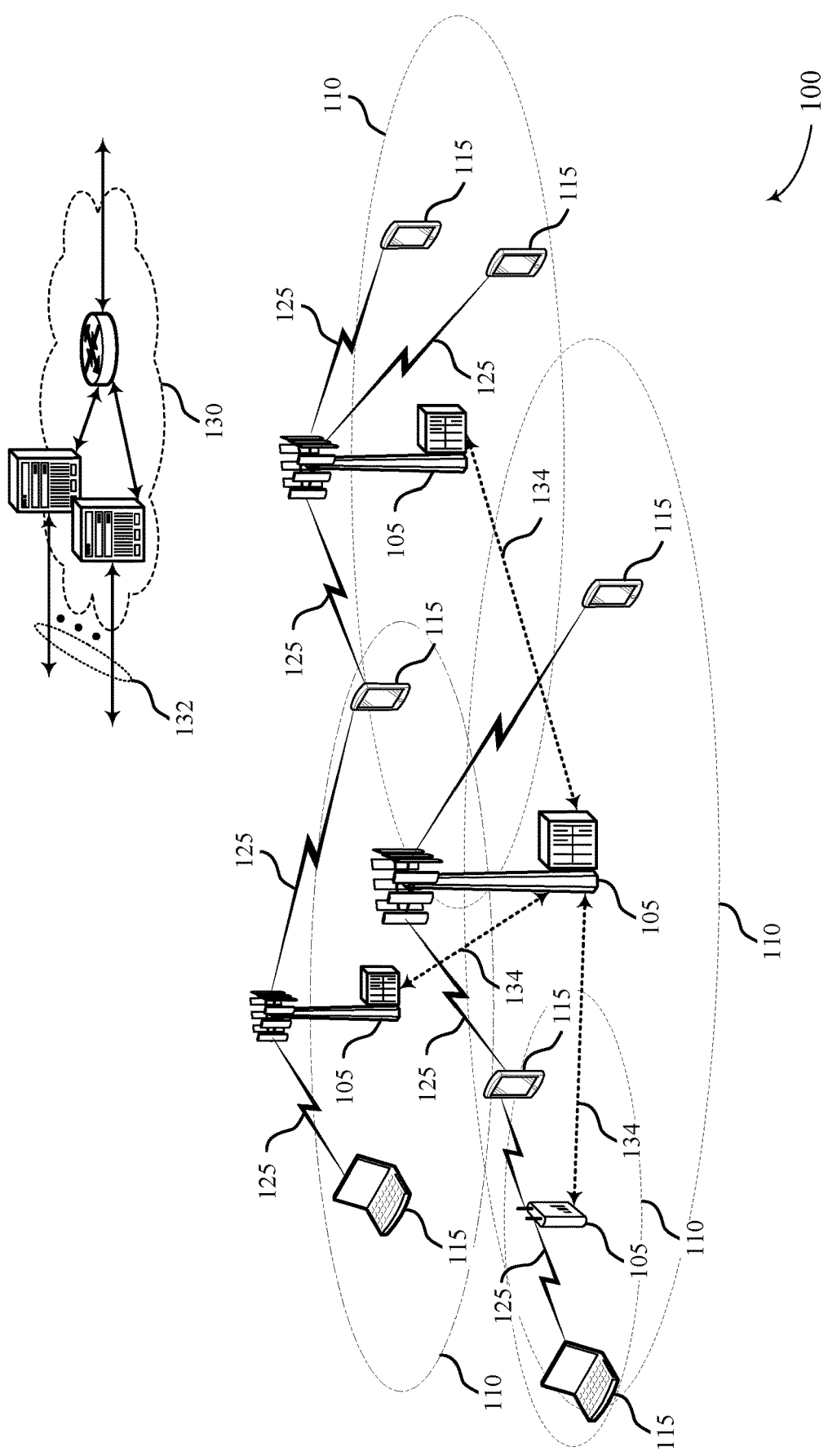
FIG. 1 illustrates an example of a system for wireless communication that supports synchronization techniques using frequency hopping in unlicensed radio frequency spectrum in accordance with aspects of the present disclosure.

The described techniques relate to improved methods, systems, devices, or apparatuses that support synchronization techniques using frequency hopping in unlicensed radio frequency spectrum. Generally, the described techniques provide for transmission of synchronization signals using frequency hopping across a number of hopping frequencies in unlicensed or shared radio frequency spectrum. In some cases, the synchronization signals may be transmitted without performing a listen-before-talk (LBT) routine prior to starting transmission on the shared radio frequency spectrum.

In some examples, unlicensed radio frequency spectrum bands may be used for wireless communications, such as Long Term Evolution (LTE) or LTE-Advanced (LTE-A) communications, for example. Unlicensed radio frequency spectrum may be used in combination with, or independent from, a dedicated or licensed radio frequency spectrum band. The dedicated radio frequency spectrum band may include a radio frequency spectrum band licensed to particular users for particular uses. The unlicensed or shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner. The terms unlicensed radio frequency spectrum and shared radio frequency spectrum are used interchangeably herein.

Some wireless systems may enable communication between a base station and a UE over shared or unlicensed radio frequency spectrum bands, or over different radio frequency spectrum bands (e.g., licensed radio frequency spectrum bands and unlicensed radio frequency spectrum bands). When initially performing a cell acquisition, or when identifying one or more neighbor cells when connected with a service cell, a UE may identify one or more synchronization signals of a base station, such as a primary synchronization signal (PSS), a secondary synchronization signal (SSS), or both. The synchronization signal(s) may allow the UE to identify a physical cell identity (ID), and time slot and frame synchronization, which may allow the UE to read a system information block (SIB) of a base station. When using shared radio frequency spectrum, transmitters may have limitations on the use of the spectrum and may or may not be transmitting when a UE may be trying to locate a synchronization signal. Efficient transmission and identification of synchronization signals when using shared spectrum may thus allow for more efficient network operation.

Transmissions in wireless communications systems utilizing unlicensed radio frequency spectrum may be commenced following initial system acquisition by a UE that is performed by acquiring one or more synchronization signals, determining a system timing and synchronization information and cell ID (e.g., base station ID). Once the UE has synchronization information (e.g., slot and subframe synchronization) and the cell ID of a base station, the UE may read a system information block (SIB) transmitted by the base station. As indicated above, when using shared radio frequency spectrum, limits may be placed on transmitters to prevent any particular transmitter from occupying the spectrum for an unfair amount of time. In some cases, transmitters may perform LBT routines, such as a clear channel assessment (CCA), to verify that no other transmitters are using a channel prior to starting transmissions. Thus, a transmitter may not be transmitting on a particular channel at any particular time, which may in some cases result in inefficiencies for a UE or other receiver that may be attempting to identify a transmitter on a network. In some instances, transmitters may send transmissions on shared spectrum without performing LBT routines prior to such transmissions, allowing more efficient use of the spectrum to assist a UE in identifying the transmitter on the network. These types of transmissions may be limited by regulatory constraints on the amount of time a transmission without prior LBT routines may occupy the shared spectrum. Various techniques provided herein may provide synchronization signal transmissions using frequency hopping that may allow more reliable identification of transmitters, such as base stations, that are using shared radio frequency spectrum.

In some examples, a base station may identify a set of hop frequencies for transmitting synchronization signals, and transmit synchronization signals using a hopping pattern over the hop frequencies. A UE seeking to identify the base station may monitor one or more of the hop frequencies to identify one or more synchronization signals on the hop frequency. A system timing may be identified in some cases, and one or more base station IDs (e.g., cell IDs) may be identified. In some cases, a hop frequency may be monitored for a duration that may span the transmission of two or more synchronization signals of a particular base station, based on a periodicity of synchronization signal transmissions on each hop frequency. In some cases, the synchronization signals may be transmitted without performing a LBT routine prior to starting transmission on the shared radio frequency spectrum.

Aspects of the disclosure are initially described in the context of a wireless communications system. Aspects of the disclosure are further illustrated by and described with reference to apparatus diagrams, system diagrams, and flowcharts that relate to synchronization techniques using frequency hopping in unlicensed radio frequency spectrum.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support synchronization techniques using frequency hopping in unlicensed radio frequency spectrum.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A carrier may also be referred to as a CC, a layer, a channel, etc. The term "component carrier" may refer to each of the multiple carriers utilized by a UE 115 in CA operation, and may be distinct from other portions of system bandwidth. For instance, a component carrier may be a relatively narrow-bandwidth carrier susceptible of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode.

A carrier used for downlink may be referred to as a downlink CC, and a carrier used for uplink may be referred to as an uplink CC. A UE 115 may be configured with multiple downlink CCs and one or more uplink CCs for carrier aggregation. Each carrier may be used to transmit control information (e.g., reference signals, control channels, etc.), overhead information, data, etc. A UE 115 may communicate with a single base station 105 utilizing multiple carriers, and may also communicate with multiple base stations simultaneously on different carriers. Each cell of a base station 105 may include an uplink CC and a downlink CC.

The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information, e.g., acknowledgment/negative acknowledgment (ACK/NACK), channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A UE 115 may in some cases, such as in initial system acquisition, attempt to identify one or more base stations 105 that may be transmitting in the wireless communication system 100 through acquiring one or more synchronization signals transmitted by each base station 105. Based on the synchronization signals, the UE 115 may determine system timing and synchronization information, and a cell ID associated with the base station 105 that transmitted the synchronization signal. A UE 115 may first attempt to identify a primary synchronization signal (PSS), which may be located in a pre-specified OFDM symbol of a subframe (e.g., in a last OFDM symbol of a first time slot of a subframe). This may enable the UE 115 to be synchronized on the subframe level. The PSS may be repeated at a known periodicity (e.g., every 5th subframe). From PSS, the UE 115 may also obtain a physical layer identity (0 to 2). The UE 115 may then identify a secondary synchronization signal (SSS). SSS symbols may also located in the same subframe of PSS, such as in a symbol that precedes the PSS, and based on the SSS may obtain a physical layer cell identity group number (0 to 167). Using the physical layer identity and cell identity group number, the UE 115 may determine the physical layer cell identity (PCI) for this cell. In LTE, 504 PCI are allowed. Once the 115 UE knows the PCI for a given cell, it may determine the location of cell reference signals and may read a SIB, which may be broadcast in a physical broadcast channel (PBCH).

In some examples, a base station 105 may transmit PSS/SSS/PBCH using frequency hopping techniques. In such cases, the base station 105 may identify a set of hop frequencies for transmitting synchronization signals, and transmit synchronization signals using a hopping pattern over the hop frequencies. A UE 115 seeking to identify the base station 105 may monitor one or more of the hop frequencies to identify one or more synchronization signals on the hop frequency. In some cases, a hop frequency may be monitored for a duration that may span the transmission of two or more synchronization signals of a particular base station 105, based on a periodicity of synchronization signal transmissions on each hop frequency. In some cases, the synchronization signals may be transmitted without performing a LBT routine prior to starting transmission on the shared radio frequency spectrum.

Figure 2:
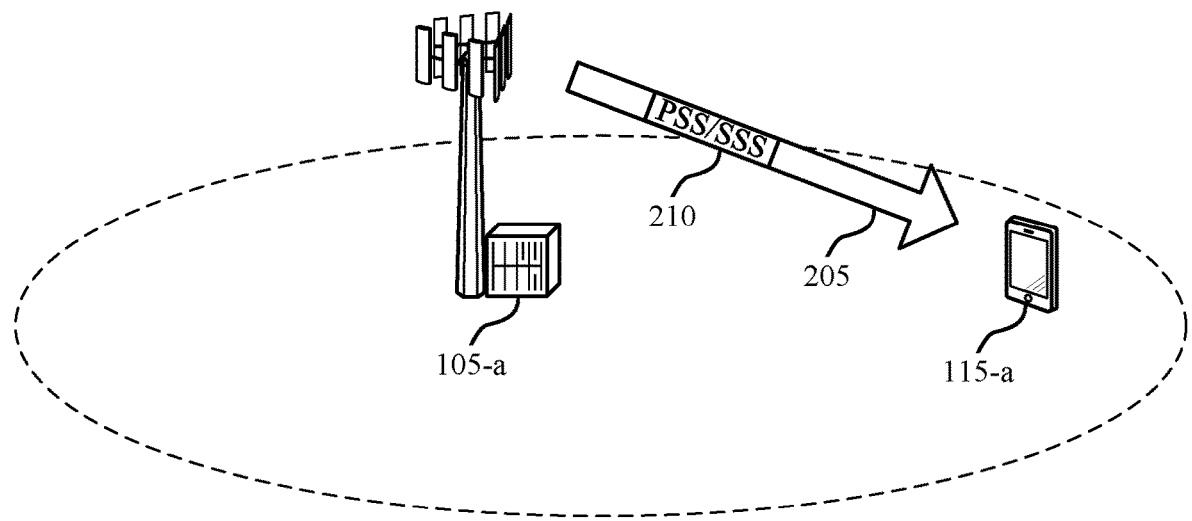
FIG. 2 illustrates an example of a wireless communications system that supports synchronization techniques using frequency hopping in unlicensed radio frequency spectrum in accordance with aspects of the present disclosure.

FIG. 2 illustrates an example of a wireless communications system 200 that supports two-stage uplink grants for communications utilizing unlicensed spectrum. The wireless communications system 200 may include a base station 105-a and UE 115-a, which may be examples of the corresponding devices as described with reference to FIG. 1. Base station 105-a may transmit downlink transmissions 205 to UE 115-a, which may include synchronization signals such as PSS/SSS 210. Various techniques as discussed herein may use frequency hopping to transmit synchronization signals, such as PSS/SSS 210, and these communications may utilize unlicensed spectrum.

Frequency hopping may be used for transmissions in unlicensed radio frequency spectrum to help improve interference handling/mitigation/diversity, for example. As indicated above, unlicensed radio frequency spectrum may have limits on the maximum amount of time per transmission/ transmission sequence. For example, in some cases, if no LBT is used, regulatory constraints may limit a transmitter using frequency hopping to 5 ms ON transmission durations and 5 ms OFF durations, with a 15 ms maximum ON time per hop frequency. In some cases, for frequency hopping without LBT, a minimum number of hop frequencies may be required. For example, 15 or more hop frequencies may be needed for frequency hopping mode without LBT under some constraints. In some cases, uniform or non-uniform hopping may be allowed across the hopping frequencies.

Given such constraints, various frequency hopping patterns may be used to provide synchronization information without an LBT routine.

Figure 3:
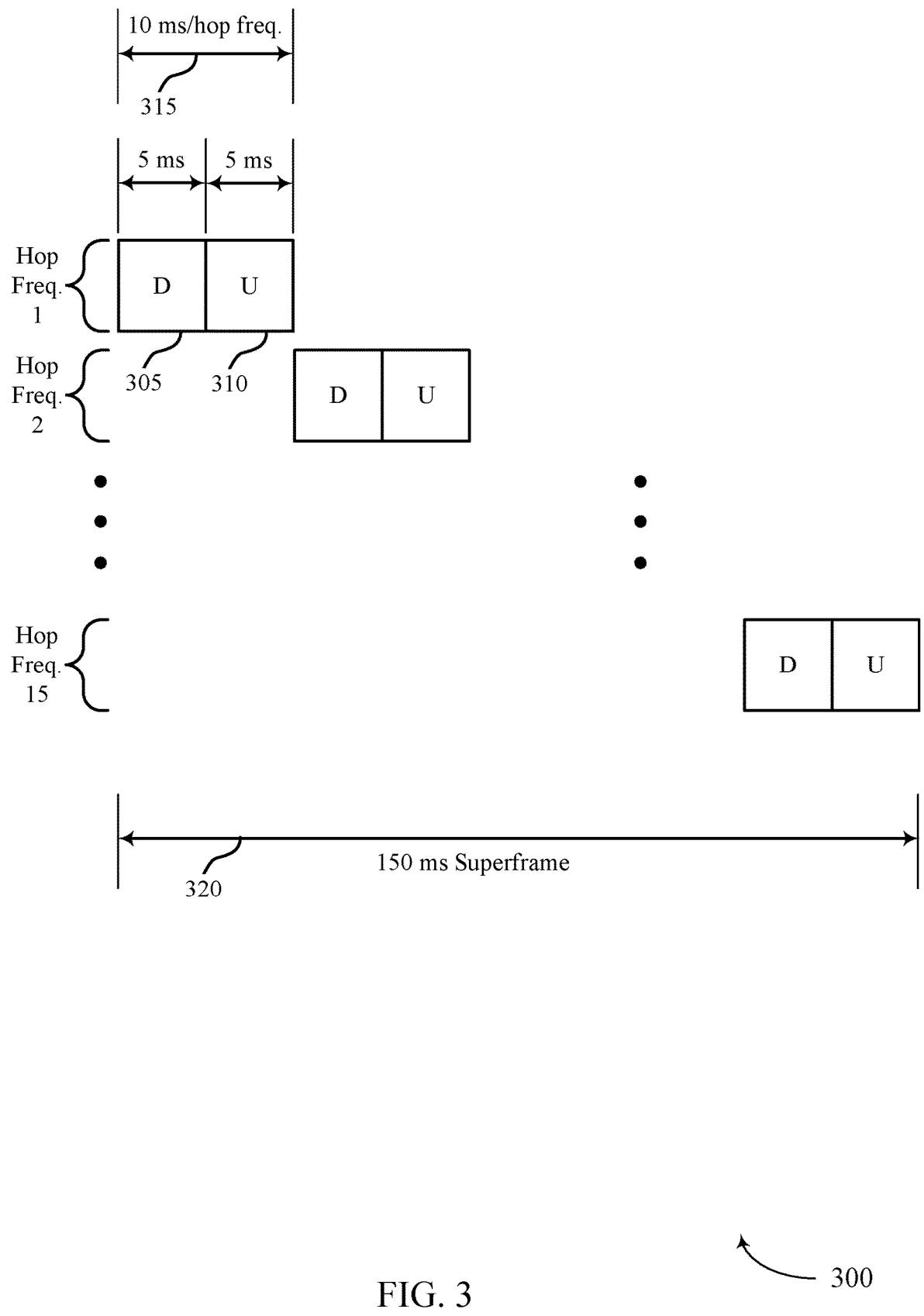
FIG. 3 illustrates an example of a frequency hopping pattern that supports synchronization techniques using frequency hopping in unlicensed radio frequency spectrum in accordance with aspects of the present disclosure.
Figure 4:
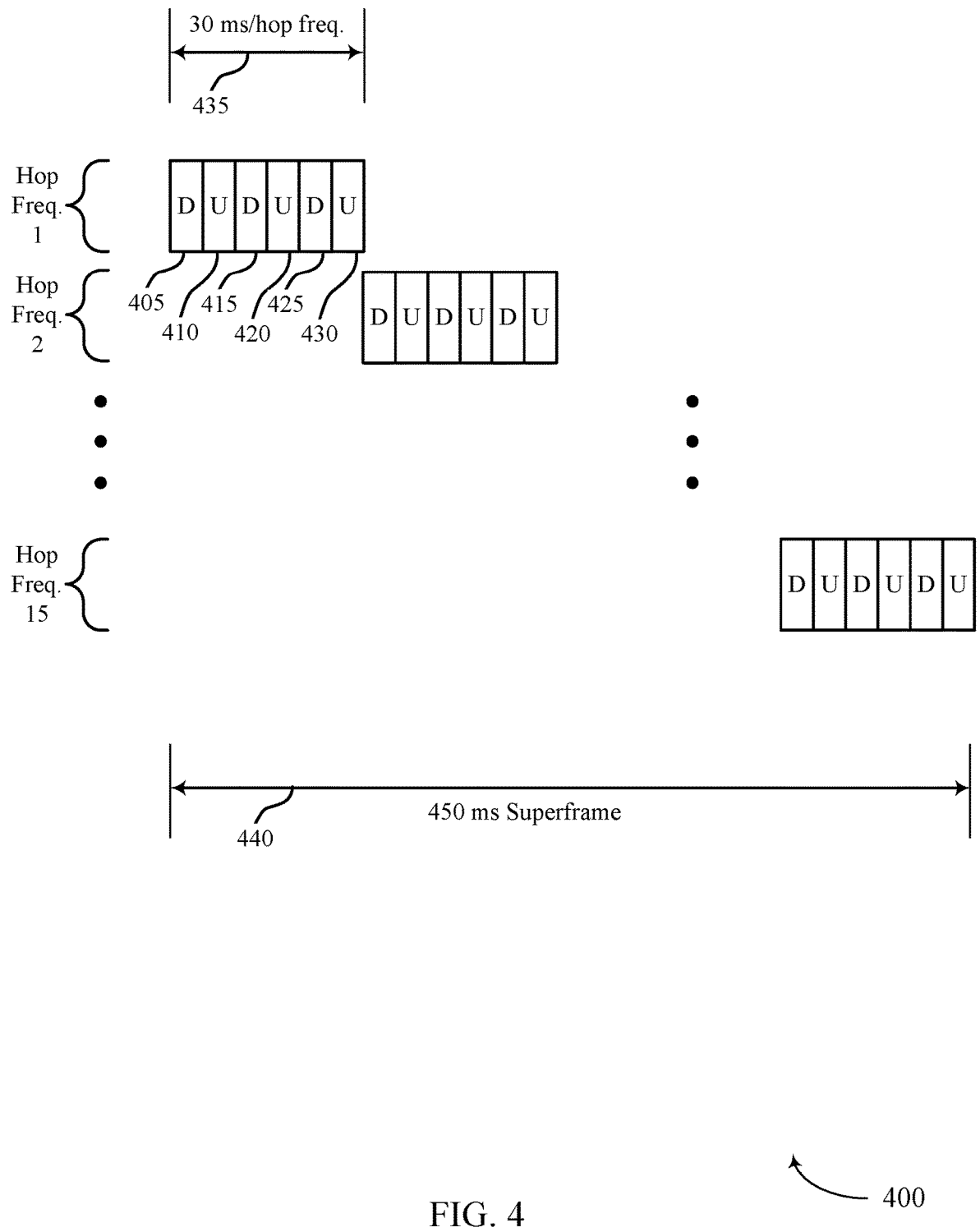
FIG. 4 illustrates an example of a frequency hopping pattern that supports synchronization techniques using frequency hopping in unlicensed radio frequency spectrum in accordance with aspects of the present disclosure.

FIGS. 3 and 4 illustrate examples of a frequency hopping patterns 300 and 400, respectively, that support synchronization techniques using frequency hopping in unlicensed radio frequency spectrum in accordance with various aspects of the present disclosure. Frequency hopping patterns 300 and 400 may be utilized by base stations 105 and UEs 115 as described with reference to FIGS. 1 and 2.

As discussed above, in some cases (e.g., according to European Union (EU) regulations) frequency hopping in unlicensed radio frequency spectrum without LBT may be constrained to timings of 5 ms ON, 5 ms OFF, and a maximum of 15 ms of ON time per hop frequency, with at least 15 hopping frequencies. In some cases (e.g., in hybrid mode in the United States of America (USA)), no constraints may be present on the number of hopping frequencies, and thus 2 or 4 hop frequencies may be used in such cases. In the example of FIG. 3, one downlink transmission 305 and one uplink transmission 310 may be used in one hopping frame 315 of a first hop frequency, followed by the same repeated hop frame transmissions on each of a second through fifteenth hop frequency. Thus, such a hopping pattern 300 results in a 150 ms superframe 320 during which the base station will cycle through all of the hopping frequencies in its hopping pattern. While this example shows simply sequentially transmitting on concurrent hop frequencies, other patterns may be used in which non-adjacent hop frequencies are used for consecutive hopping frames 315.

In the example of FIG. 4, frequency hopping pattern 400 uses the full 15 ms of available ON time per hop frequency, with 5 ms of ON time and 5 ms of OFF time, thus resulting in downlink transmissions 405, 415, and 425, and available uplink portions 410, 420, and 430 within hopping frame 435. Again, in this example 15 hop frequencies may be used, resulting in a 450 ms superframe 440.

A UE that establishes a connection with a base station using such hopping patterns 300 or 400 may determine the number of hop frequencies and duration of each hopping frame for each serving cell, and may engage in uplink and downlink communications with the base station according to the hopping pattern. In some cases, the choice of hopping frame duration may be a configurable parameter, and may be region/deployment specific. In some cases, a longer transmission on a frequency may result in improved channel estimation due to coherent combining. A UE, in order to perform an initial acquisition, or to perform idle mode mobility procedures in systems that may use frequency hopping may monitor one or more of the hop frequencies and acquire synchronization signals according to various techniques such as discussed herein.

In some cases, for acquisition with 'N' hop frequencies and an equal split between DL and UL subframes, a UE may initially be unaware of a hopping pattern that may be used by a base station, but will know that the base station will transmit on a particular hop frequency within a certain duration, namely once per superframe 320 or 440. Thus, the UE may monitor at least N*10/30 ms on a given hop frequency to detect single instance of a PSS/SSS/PBCH transmission, where 10/30 ms refers to 10 ms when referencing superframe 320 and to 30 ms when referencing superframe 440. In some cases, a UE may perform cell acquisition using a single instance of a PSS/SSS/PBCH, and may use a sliding searcher window of less than 5 ms, which can detect PSS/SSS and keep track of candidates. In other cases, multiple synchronization signal transmissions may be combined. In such cases, if M PSS/SSS signals are combined, a window duration of M*N*10/30 ms may be used for initial cell acquisition. In some cases, a buffer size of the UE may need to accommodate relatively long windows, and a size of search window may be selected based on capabilities and buffer sizes for UEs that are expected to be served in a system. In some cases, in RRC-connected mode for neighbor cell measurements and radio resource management (RRM), a base station may configure connected UEs with the hop frequency (or hopping pattern) and measurement gap for a given neighbor cell. In RRC-idle mode, a UE may perform the entire cell-acquisition procedure to monitor other cells for mobility management. In some cases, a base station may pre-configure UEs with parameters of all cells in a limited area deployment (e.g. in a factory or warehouse), or a UE may be configured to perform the entire cell-acquisition procedure to identify cells in a limited area deployment periodically and then maintain parameters for identified cells until the next periodic cell-acquisition procedure.

Figure 5:
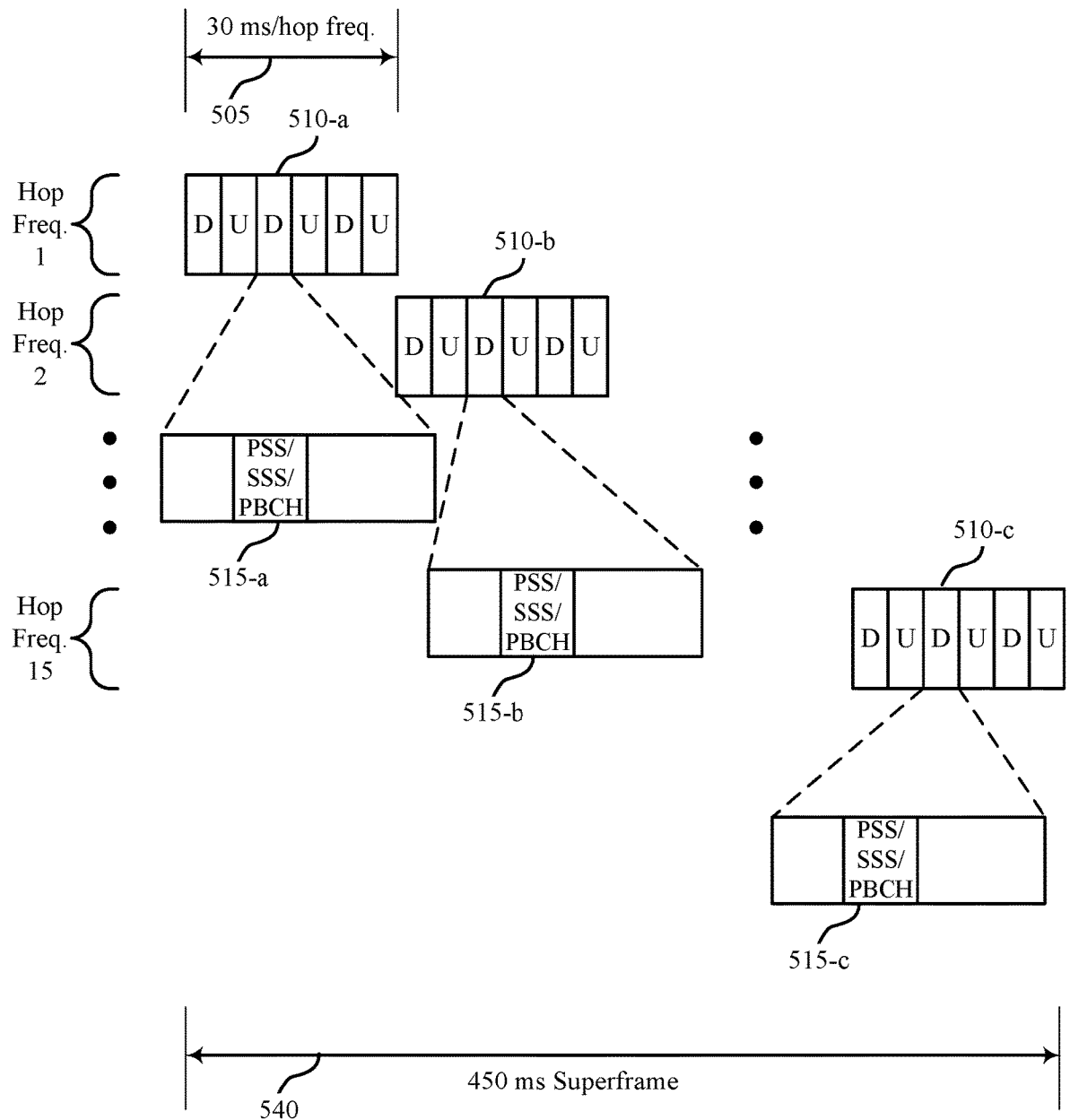
FIG. 5 illustrates an example of a frequency hopping pattern with synchronization signals that supports synchronization techniques using frequency hopping in unlicensed radio frequency spectrum in accordance with aspects of the present disclosure.

FIG. 5 illustrates an example of a frequency hopping pattern with synchronization signals 500 that supports synchronization techniques using frequency hopping in unlicensed radio frequency spectrum in accordance with various aspects of the present disclosure. Frequency hopping pattern with synchronization signals 500 may be utilized by base stations 105 and UEs 115 as described with reference to FIGS. 1 and 2.

In this example, a base station may transmit PSS/SSS/PBCH 515 on all hop frequencies at a low duty cycle. Thus, in a hopping frame 505, one downlink ON duration 510 may include PSS/SSS/PBCH 515. The base station may hop across all of the configured hop frequencies, which is 15 hop frequencies in this example, thus providing a 450 ms superframe 540. Thus, in hopping frame 505, ON duration 510-a may include PSS/SSS/PBCH 515-a. The next hopping frame may include ON duration 510-b that includes PSS/SSS/PBCH 515-b. The last illustrated hopping frame may include ON duration 510-c that includes PSS/SSS/PBCH 515-c. The sequence of hop frequencies may be consecutive hop frequencies, or may be some randomized order, for example. In some cases, the hopping pattern may be generated by generating a permutation sequence of hop frequencies of the set of different hop frequencies. In some cases, the location of PSS/SSS/PBCH 515 may be randomized across different hop frequencies. In other cases, the location of PSS/SSS/PBCH 515 may be the same for each hop frequency, and thus a UE may be able to obtain slot and subframe timing synchronization (e.g., system timing) through identifying PSS/SSS/PBCH 515 of different base stations on a single hop frequency. In some aspects, the PBCH may refer to a physical channel signal. In some aspects, the PBCH may carry or otherwise convey an indication of the hop frequencies, such as a raster (e.g., a list) of hop frequencies from a base station.

Figure 6:
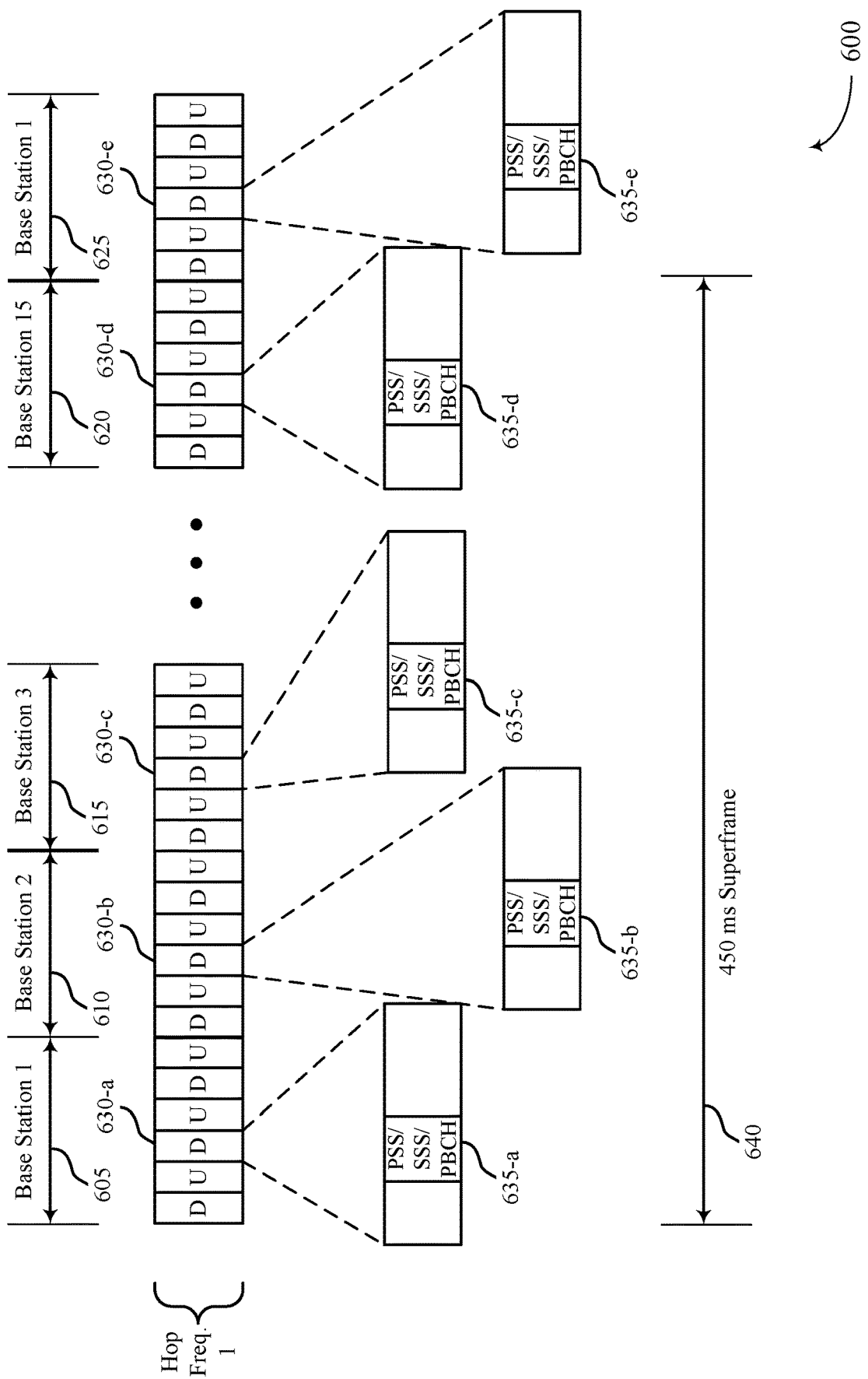
FIG. 6 illustrates an example of a hop frequency with multiple synchronization signals that supports synchronization techniques using frequency hopping in unlicensed radio frequency spectrum in accordance with aspects of the present disclosure.

FIG. 6 illustrates an example of a hop frequency with multiple synchronization signals 600 that supports synchronization techniques using frequency hopping in unlicensed radio frequency spectrum in accordance with various aspects of the present disclosure. The hop frequency with multiple synchronization signals 600 may be utilized by base stations 105 and UEs 115 as described with reference to FIGS. 1 and 2.

In this example, a UE may monitor a first hop frequency, and multiple base stations may transmit periodically on the first hop frequency. In this example, 15 base stations may transmit consecutive hopping frames 605 through 620 within a 450 ms superframe 640, and this cycle may repeat for subsequent superframes 640. Thus, a first base station may transmit, in a first hopping frame 605, a first downlink transmission 630-*a* that may include PSS/SSS/PBCH 635-*a*, and then transmit (after cycling through the remaining hop frequencies) in a second hopping frame 625 a second downlink transmission 630-*e* containing PSS/SSS/PBCH 635-*e*. A second base station may transmit, in hopping frame 610, a downlink transmission 630-*b* that may include PSS/SSS/PBCH 635-*b*. A third base station may transmit, in hopping frame 615, a downlink transmission 630-*c* that may include PSS/SSS/PBCH 635-*c*. The fifteenth base station may transmit, in hopping frame 620, a downlink transmission 630-*d* that may include PSS/SSS/PBCH 635-*d*.

A UE monitoring the first hop frequency may detect PSS/SSS/PBCH 635 of multiple base stations, many of which could be strong cells. If fewer than 15 base stations are deployed, some of the 30 ms hopping frames 605 through 625 may be empty, depending on the hop configuration. In some cases, the base stations may be in a time-synchronized network and may each use a same PSS sequence, which may allow a UE to perform time synchronization using PSS from multiple base stations. In some cases, a UE may detect the first PSS/SSS/PBCH 635-*a*, and based on the superframe 640 duration, detect the second PSS/SSS/PBCH 635-*e*, and read the associated SIB.

Figure 7:
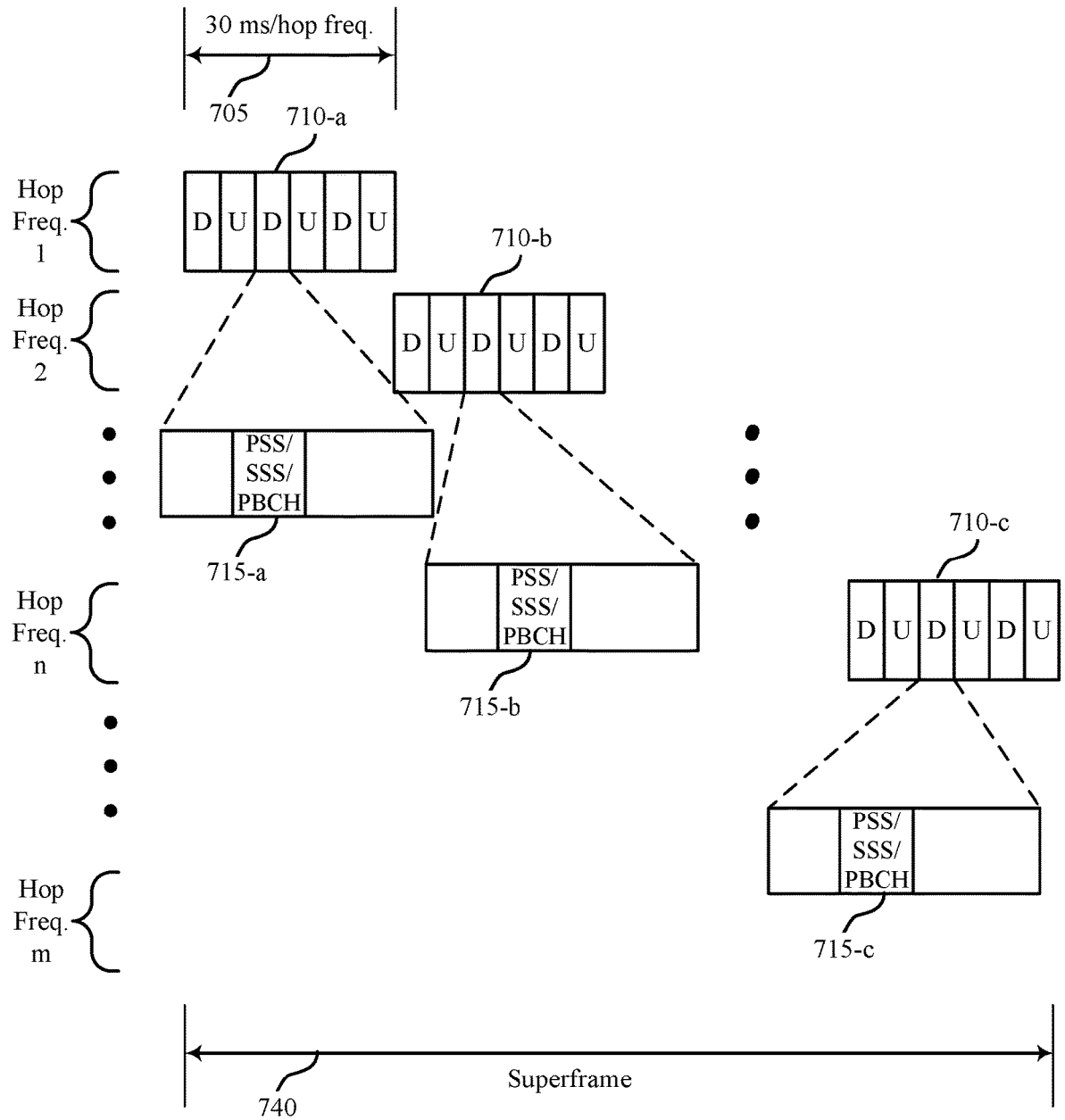
FIG. 7 illustrates an example of a frequency hopping pattern with synchronization signals that supports synchronization techniques using frequency hopping in unlicensed radio frequency spectrum in accordance with aspects of the present disclosure.

FIG. 7 illustrates another example of a frequency hopping pattern with synchronization signals 700 that supports synchronization techniques using frequency hopping in unlicensed radio frequency spectrum in accordance with various aspects of the present disclosure. The frequency hopping pattern with synchronization signals 700 may be utilized by base stations 105 and UEs 115 as described with reference to FIGS. 1 and 2.

In this example, a base station may transmit on a subset of hop frequencies from m available hop frequencies, with a 30 ms hopping frame 705 duration. In this example, a base station may transmit using n hop frequencies (rather than the full m set of available hop frequencies), and thus a superframe 740 duration may be n*30 ms. In cases where 15 hop frequencies are used, the superframe 740 may still be 450 ms, and some of the hop frequencies may be empty. In cases, where fewer than 15 hop frequencies may be used, the superframe 740 duration may be reduced. In some cases, similarly as discussed above, base station may transmit PSS/SSS/PBCH 715 in a downlink transmission 710 in each hopping frame 705. Thus, the base station may transmit downlink transmission 710-*a* including PSS/SSS/PBCH 715-*a* during hopping frame 705, transmit downlink transmission 710-*b* including PSS/SSS/PBCH 715-*b* during the next hopping frame, and transmit downlink transmission 710-*c* including PSS/SSS/PBCH 715-*c* during the final illustrated hopping frame. In some cases, a UE may have prior knowledge that only a subset of frequencies is used. For example, a raster (e.g., a list) of center frequencies for each hop frequency may be provided (e.g., in a physical channel signal, such as PBCH), with only a subset of hop frequencies used for PSS/SSS transmission. In some cases, PSS/SSS/PBCH 715 locations, and transmission durations of each PSS/SSS transmission per hop frequency (e.g., the transmission duty cycle for the respective PSS/SSS transmissions on the n hop frequencies of the m available hop frequencies), may be a function of the number of hop frequencies and the number of deployed base stations in the network. In some examples, the duty cycle for the respective PSS/SSS transmissions per hop frequency may decrease as the number of deployed base stations in the network increases, and increase as the number of number of deployed base stations in the network decreases. In some aspects, the UE may identify the hop frequencies based on the PBCH (e.g., may identify which hop frequencies are being used, the order or pattern of the hops within the hop frequencies, use some permutation of the hop frequencies indicated in the PBCH, and the like) and determine system timing (e.g., slot and subframe timing) based on PSS/SSS. Accordingly, the UE may identify a hopping pattern (e.g., for a base station) as an ordered list of the hop frequencies indicated in the PBCH that proceeds from hop frequency to hop frequency in the order specified in the ordered list (or some permutation thereof), and system timing information associated with the frequency hopping from the PSS/SSS.

Figure 8:
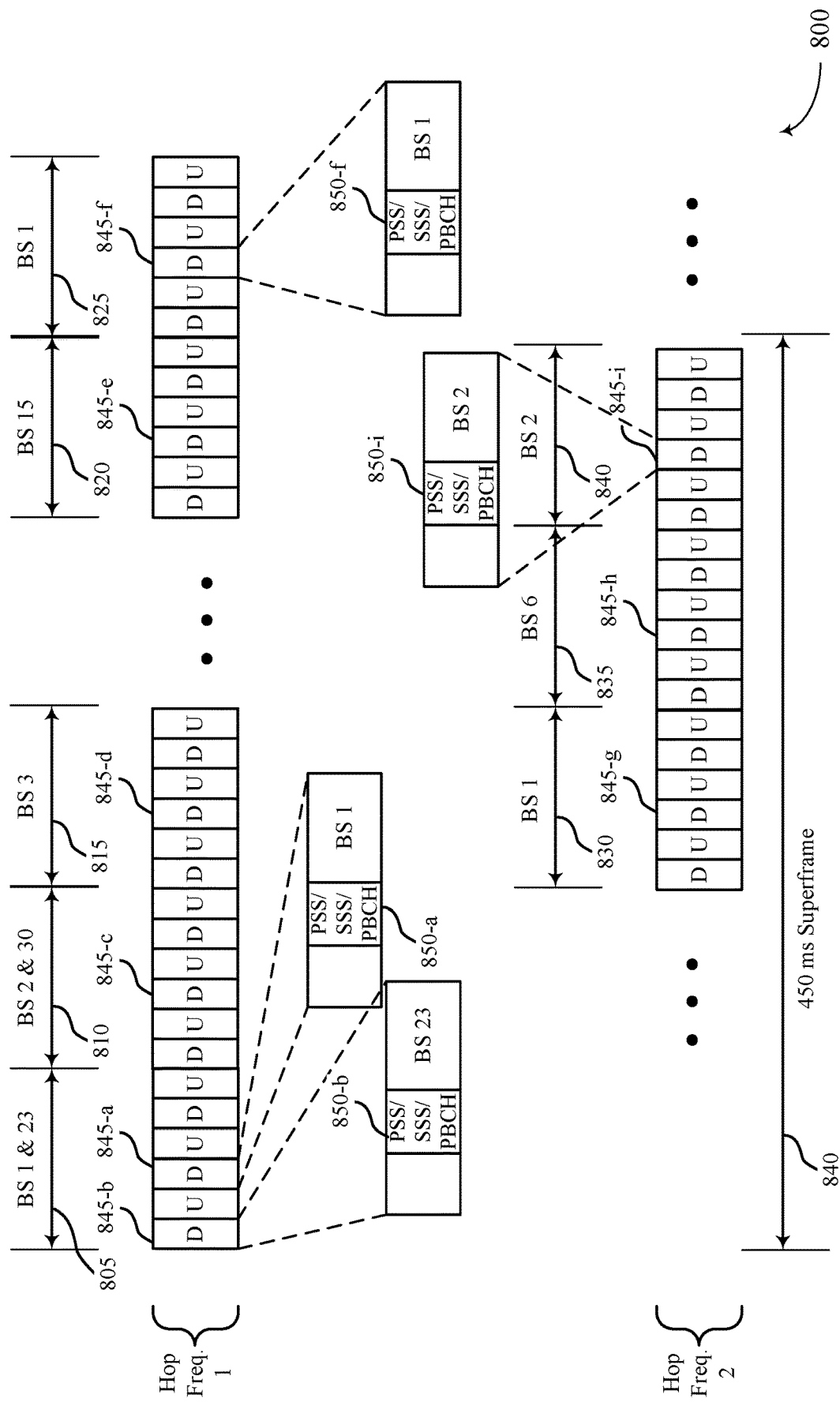
FIG. 8 illustrates an example of a hop frequency with multiple synchronization signals that supports synchronization techniques using frequency hopping in unlicensed radio frequency spectrum in accordance with aspects of the present disclosure.

FIG. 8 illustrates an example of hop frequencies with multiple synchronization signals 800 that supports synchronization techniques using frequency hopping in unlicensed radio frequency spectrum in accordance with various aspects of the present disclosure. The hop frequencies with multiple synchronization signals 800 may be utilized by base stations 105 and UEs 115 as described with reference to FIGS. 1 and 2.

As discussed above, in some cases a number of hop frequencies may be used and a number of base stations may be present in a network. In some cases, a greater number of base stations than hop frequencies may be present, and thus multiple base stations may transmit in one hopping frame. In this example, hopping frames 805 through 825 may be present on a first hop frequency, and hop frames 830 through 840 may be present on a second hop frequency. In this example, 15 hop frequencies may be used, with a 30 ms hop frame duration, resulting in a superframe 840 that has a 450 ms duration. In this example, a first base station (BS1) and a second base station (BS23) may each transmit in a first hopping frame 805. In this example, the first base station (BS1) may transmit downlink transmission 845-*a* with PSS/SSS/PBCH 850-*a*, and the second base station (BS23) transmit downlink transmission 845-*b* with PSS/SSS/PBCH 850-*b*. In such cases, each base station may transmit using an orthogonal resource (e.g., using a different time resource) within the hopping frame in order to avoid collisions. During hopping frame 810, a base station 2 (BS2) and base station 30 (BS30) may transmit downlink transmission 845-*c* with PSS/SSS/PBCH. During hopping frame 815, a base station 3 (BS3) may transmit downlink transmission 845-*d* with PSS/SSS/PBCH. During hopping frame 820, a base station 15 (BS15) may transmit downlink transmission 845-*e* with PSS/SSS/PBCH. During hopping frame 825, the first base station (BS1) may transmit downlink transmission 845-*f* with PSS/SSS/PBCH.

The second hop frequency may include transmissions of multiple base stations in multiple hop frames 830 through 840, in a similar manner. In some cases, the hopping pattern of different base stations may be different, and thus the first base station (BS1) and the second base station (BS23) may not always transmit in a same hopping frame for different hop frequencies. During hopping frame 830, the first base station (BS1) may transmit downlink transmission 845-*g* with PSS/SSS/PBCH. During hopping frame 835, a base station 6 (BS6) may transmit downlink transmission 845-*h* with PSS/SSS/PBCH. During hopping frame 840, the base station 2 (BS2) may transmit downlink transmission 845-*i* with PSS/SSS/PBCH 850-*i*.

Figure 9:
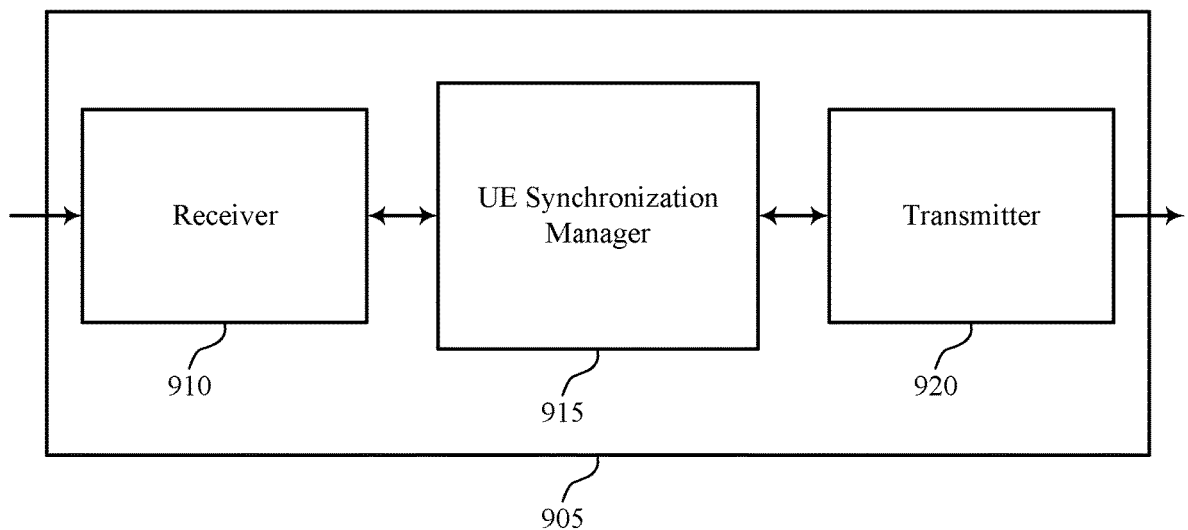
FIGS. 9 through 11 show block diagrams of a device that supports synchronization techniques using frequency hopping in unlicensed radio frequency spectrum in accordance with aspects of the present disclosure.

FIG. 9 shows a block diagram 900 of a wireless device 905 that supports synchronization techniques using frequency hopping in unlicensed radio frequency spectrum in accordance with various aspects of the present disclosure.

Wireless device 905 may be an example of aspects of a UE 115 as described with reference to FIG. 1. Wireless device 905 may include receiver 910, UE synchronization manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to synchronization techniques using frequency hopping in unlicensed radio frequency spectrum, etc.). Information may be passed on to other components of the device. The receiver 910 may be an example of aspects of the transceiver 1235 described with reference to FIG. 12.

UE synchronization manager 915 may be an example of aspects of the UE synchronization manager 1215 described with reference to FIG. 12.

UE synchronization manager 915 and/or at least some of its various sub-components may be implemented in hardware, software executed by a processor, firmware, or any combination thereof. If implemented in software executed by a processor, the functions of the UE synchronization manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE synchronization manager 915 and/or at least some of its various sub-components may be physically located at various positions, including being distributed such that portions of functions are implemented at different physical locations by one or more physical devices. In some examples, UE synchronization manager 915 and/or at least some of its various sub-components may be a separate and distinct component in accordance with various aspects of the present disclosure. In other examples, UE synchronization manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE synchronization manager 915 may receive, on a first hop frequency of a set of available hop frequencies in an unlicensed radio frequency spectrum band, two or more synchronization signals from a first base station, identify a first synchronization signal of the first base station based on the received two or more synchronization signals, and receive, on the first hop frequency, a second synchronization signal of the first base station based on a periodicity of synchronization signal transmissions on one or more hop frequencies of the set of available hop frequencies.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
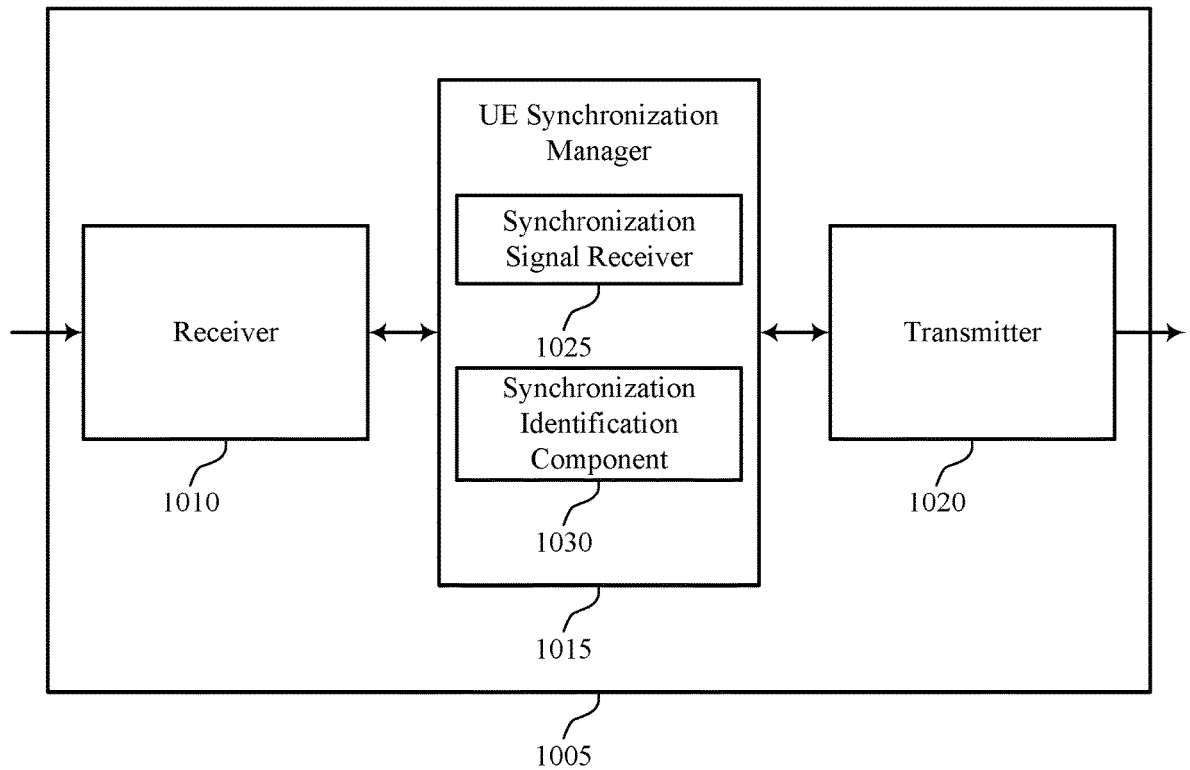

FIG. 10 shows a block diagram 1000 of a wireless device 1005 that supports synchronization techniques using frequency hopping in unlicensed radio frequency spectrum in accordance with various aspects of the present disclosure.

Wireless device 1005 may be an example of aspects of a wireless device 905 or a UE 115 as described with reference to FIGS. 1 and 9. Wireless device 1005 may include receiver 1010, UE synchronization manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to synchronization techniques using frequency hopping in unlicensed radio frequency spectrum, etc.). Information may be passed on to other components of the device. The receiver 1010 may be an example of aspects of the transceiver 1235 described with reference to FIG. 12.

UE synchronization manager 1015 may be an example of aspects of the UE synchronization manager 1215 described with reference to FIG. 12. UE synchronization manager 1015 may also include synchronization signal receiver 1025 and synchronization identification component 1030.

Synchronization signal receiver 1025 may receive, on a first hop frequency of a set of available hop frequencies in an unlicensed radio frequency spectrum band, two or more synchronization signals from a first base station and receive, which may include a first synchronization signal and a second synchronization signal of a first base station, based on a periodicity of synchronization signal transmissions on one or more hop frequencies of the set of available hop frequencies. In some cases, the at least the subset of the set of available hop frequencies include a first subset of identified hop frequencies of the set of available hop frequencies. In some cases, the first subset of identified hop frequencies include a static list of hop frequencies. In some cases, the first subset of identified hop frequencies are identified center frequencies of a raster (e.g., a list) of center frequencies of the set of available hop frequencies.

Synchronization identification component 1030 may identify the first synchronization signal of the first base station based on the received two or more synchronization signals and identify a third synchronization signal of a second base station based on the received two or more synchronization signals.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
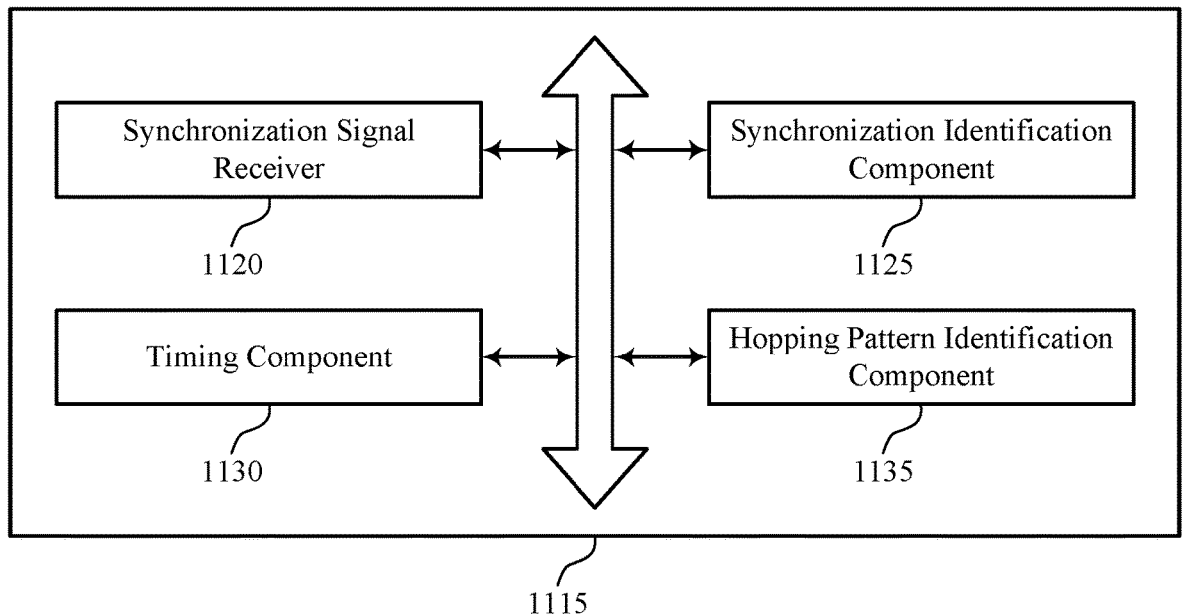

FIG. 11 shows a block diagram 1100 of a UE synchronization manager 1115 that supports synchronization techniques using frequency hopping in unlicensed radio frequency spectrum in accordance with various aspects of the present disclosure. The UE synchronization manager 1115 may be an example of aspects of a UE synchronization manager 915, a UE synchronization manager 1015, or a UE synchronization manager 1215 described with reference to FIGS. 9, 10, and 12. The UE synchronization manager 1115 may include synchronization signal receiver 1120, synchronization identification component 1125, timing component 1130, and hopping pattern identification component 1135. Each of these modules may communicate, directly or indirectly, with one another (e.g., via one or more buses).

Synchronization signal receiver 1120 may receive, on a first hop frequency of a set of available hop frequencies in an unlicensed radio frequency spectrum band, two or more synchronization signals from a first base station and receive, which may include a first synchronization signal and a second synchronization signal of a first base station, based on a periodicity of synchronization signal transmissions on one or more hop frequencies of the set of available hop frequencies. In some cases, the at least the subset of the set of available hop frequencies include a first subset of identified hop frequencies of the set of available hop frequencies. In some cases, the first subset of identified hop frequencies include a static list of hop frequencies. In some cases, the first subset of identified hop frequencies are identified center frequencies of a raster (e.g., a list) of center frequencies of the set of available hop frequencies.

Synchronization identification component 1125 may identify a first synchronization signal of the first base station based on the received two or more synchronization signals and identify a third synchronization signal of a second base station based on the received two or more synchronization signals.

Timing component 1130 may determine a system timing based on the first synchronization signal and the third synchronization signal and identify the periodicity of synchronization signal transmissions based on a duty cycle for synchronization signal transmissions on at least a subset of the set of available hop frequencies.

Hopping pattern identification component 1135 may identify a hopping pattern of the first base station based on the received first synchronization signal of the first base station. In some cases, the hopping pattern is identified based on a number of hop frequencies of the set of available hop frequencies and a duration of transmissions of the first base station on each of the set of available hop frequencies. In some cases, the number of hop frequencies is determined based on one or more of a configured bandwidth of the unlicensed radio frequency spectrum band and/or a signaled raster (e.g., a list) of hop frequencies from a base station. In some cases, the periodicity of synchronization signal transmissions on the first hop frequency is determined based on the number of hop frequencies and the duration of transmissions.

Figure 12:
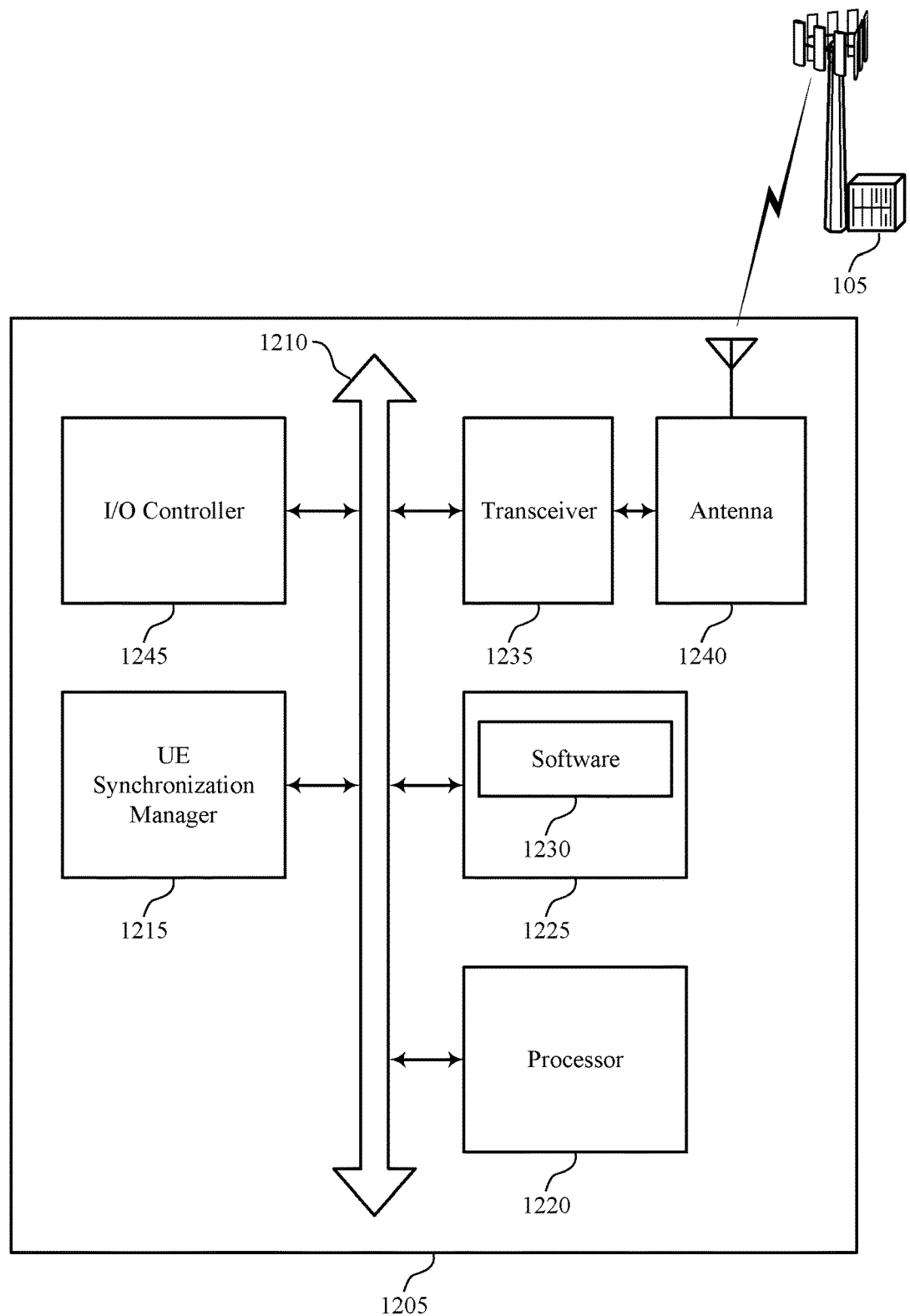
FIG. 12 illustrates a block diagram of a system including a UE that supports synchronization techniques using frequency hopping in unlicensed radio frequency spectrum in accordance with aspects of the present disclosure.

FIG. 12 shows a diagram of a system 1200 including a device 1205 that supports synchronization techniques using frequency hopping in unlicensed radio frequency spectrum in accordance with various aspects of the present disclosure. Device 1205 may be an example of or include the components of wireless device 905, wireless device 1005, or a UE 115 as described above, e.g., with reference to FIGS. 1, 9 and 10. Device 1205 may include components for bi-directional voice and data communications including components for transmitting and receiving communications, including UE synchronization manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting synchronization techniques using frequency hopping in unlicensed radio frequency spectrum).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support synchronization techniques using frequency hopping in unlicensed radio frequency spectrum. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
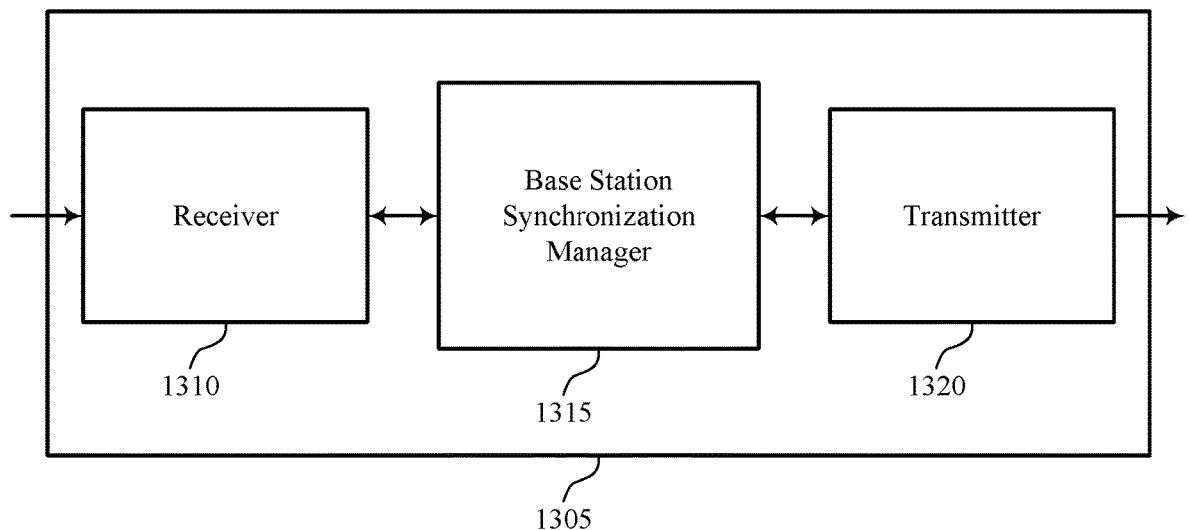
FIGS. 13 through 15 show block diagrams of a device that supports synchronization techniques using frequency hopping in unlicensed radio frequency spectrum in accordance with aspects of the present disclosure.

FIG. 13 shows a block diagram 1300 of a wireless device 1305 that supports synchronization techniques using frequency hopping in unlicensed radio frequency spectrum in accordance with various aspects of the present disclosure. Wireless device 1305 may be an example of aspects of a base station 105 as described with reference to FIG. 1. Wireless device 1305 may include receiver 1310, base station synchronization manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to synchronization techniques using frequency hopping in unlicensed radio frequency spectrum, etc.). Information may be passed on to other components of the device. The receiver 1310 may be an example of aspects of the transceiver 1635 described with reference to FIG. 16.

Base station synchronization manager 1315 may be an example of aspects of the base station synchronization manager 1615 described with reference to FIG. 16.

Base station synchronization manager 1315 and/or at least some of its various sub-components may be implemented in hardware, software executed by a processor, firmware, or any combination thereof. If implemented in software executed by a processor, the functions of the base station synchronization manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station synchronization manager 1315 and/or at least some of its various sub-components may be physically located at various positions, including being distributed such that portions of functions are implemented at different physical locations by one or more physical devices. In some examples, base station synchronization manager 1315 and/or at least some of its various sub-components may be a separate and distinct component in accordance with various aspects of the present disclosure. In other examples, base station synchronization manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station synchronization manager 1315 may identify a set of hop frequencies in an unlicensed radio frequency spectrum band for transmitting synchronization signals, identify a hopping pattern for transmitting synchronization signals on each hop frequency of the set of hop frequencies, and transmit the synchronization signals on each hop frequency of the set of hop frequencies according to the hopping pattern.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Figure 14:
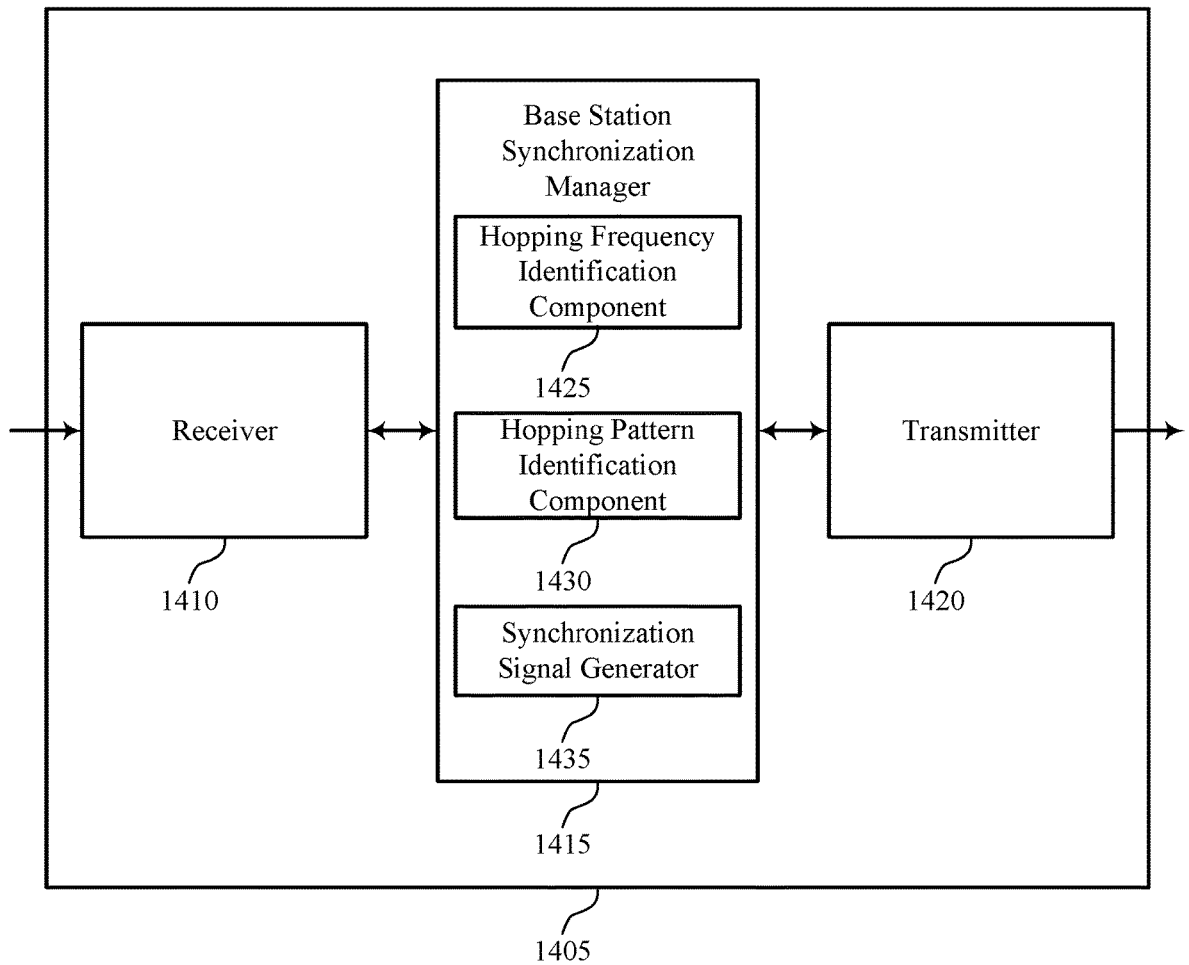

FIG. 14 shows a block diagram 1400 of a wireless device 1405 that supports synchronization techniques using frequency hopping in unlicensed radio frequency spectrum in accordance with various aspects of the present disclosure. Wireless device 1405 may be an example of aspects of a wireless device 1305 or a base station 105 as described with reference to FIGS. 1 and 13. Wireless device 1405 may include receiver 1410, base station synchronization manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to synchronization techniques using frequency hopping in unlicensed radio frequency spectrum, etc.). Information may be passed on to other components of the device. The receiver 1410 may be an example of aspects of the transceiver 1635 described with reference to FIG. 16.

Base station synchronization manager 1415 may be an example of aspects of the base station synchronization manager 1615 described with reference to FIG. 16. Base station synchronization manager 1415 may also include hopping frequency identification component 1425, hopping pattern identification component 1430, and synchronization signal generator 1435.

Hopping frequency identification component 1425 may identify a set of hop frequencies in an unlicensed radio frequency spectrum band for transmitting synchronization signals. In some cases, the set of hop frequencies is a subset of a set of available hop frequencies in the unlicensed radio frequency spectrum band. In some cases, the set of hop frequencies are identified center frequencies of a raster (e.g., a list) of center frequencies of the set of available hop frequencies.

Hopping pattern identification component 1430 may identify a hopping pattern for transmitting synchronization signals on each hop frequency of the set of hop frequencies and identify transmission duration for each hop frequency of the set of hop frequencies. In some cases, a duty cycle of synchronization signal transmissions of each hop frequency of the set of hop frequencies may correspond to a product of a number of hop frequencies in the set of hop frequencies and the transmission duration. In some cases, the identifying the hopping pattern includes generating a sequence of hop frequencies of the set of hop frequencies. In some cases, the sequence of hop frequencies is a randomized permutation sequence of hop frequencies. In some cases, the identifying the hopping pattern includes generating a sequence of consecutive hop frequencies of the set of hop frequencies. In some cases, the identifying the hopping pattern includes generating a permutation sequence of hop frequencies of the set of hop frequencies.

Synchronization signal generator 1435 may identify a location of the synchronization signals within the transmission duration based on the number of hop frequencies in the set of hop frequencies and a number of base stations transmitting synchronization signals using the set of hop frequencies and transmit the synchronization signals on each hop frequency of the set of hop frequencies according to the hopping pattern. In some cases, the transmitting the synchronization signals is performed in an absence of performing a LBT procedure on one or more hop frequencies of the set of hop frequencies.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may include a single antenna, or it may include a set of antennas.

Figure 15:
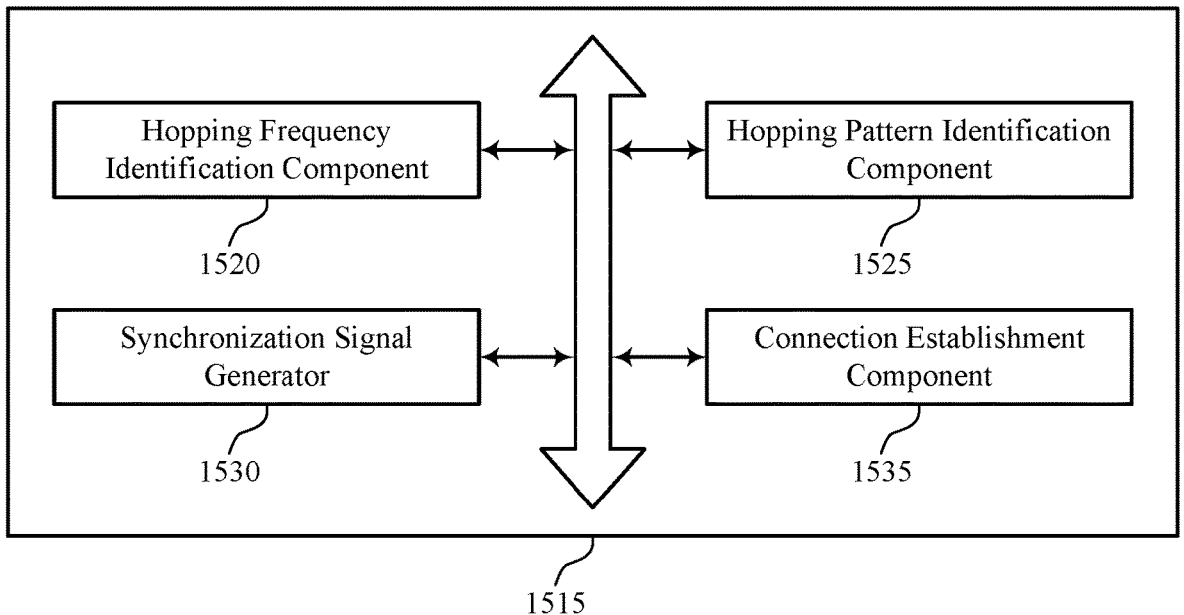

FIG. 15 shows a block diagram 1500 of a base station synchronization manager 1515 that supports synchronization techniques using frequency hopping in unlicensed radio frequency spectrum in accordance with various aspects of the present disclosure. The base station synchronization manager 1515 may be an example of aspects of a base station synchronization manager 1615 described with reference to FIGS. 13, 14, and 16. The base station synchronization manager 1515 may include hopping frequency identification component 1520, hopping pattern identification component 1525, synchronization signal generator 1530, and connection establishment component 1535. Each of these modules may communicate, directly or indirectly, with one another (e.g., via one or more buses).

Hopping frequency identification component 1520 may identify a set of hop frequencies in an unlicensed radio frequency spectrum band for transmitting synchronization signals. In some cases, the set of hop frequencies is a subset of a set of available hop frequencies in the unlicensed radio frequency spectrum band. In some cases, the set of hop frequencies are identified center frequencies of a raster (e.g., a list) of center frequencies of the set of available hop frequencies.

Hopping pattern identification component 1525 may identify a hopping pattern for transmitting synchronization signals on each hop frequency of the set of hop frequencies and identify transmission duration for each hop frequency of the set of hop frequencies, and where a duty cycle of synchronization signal transmissions of each hop frequency of the set of hop frequencies corresponds to a product of a number of hop frequencies in the set of hop frequencies and the transmission duration. In some cases, the identifying the hopping pattern includes generating a sequence of hop frequencies of the set of hop frequencies. In some cases, the sequence of hop frequencies is a randomized permutation sequence of hop frequencies. In some cases, the identifying the hopping pattern includes generating a sequence of consecutive hop frequencies of the set of hop frequencies.

Synchronization signal generator 1530 may identify a location of the synchronization signals within the transmission duration based on the number of hop frequencies in the set of hop frequencies and a number of base stations transmitting synchronization signals using the set of hop frequencies and transmit the synchronization signals on each hop frequency of the set of hop frequencies according to the hopping pattern. In some cases, the transmitting the synchronization signals is performed in an absence of performing a LBT procedure on one or more hop frequencies of the set of hop frequencies.

Connection establishment component 1535 may establish a connection with a UE and configure the UE with the set of hop frequencies and the hopping pattern.

Figure 16:
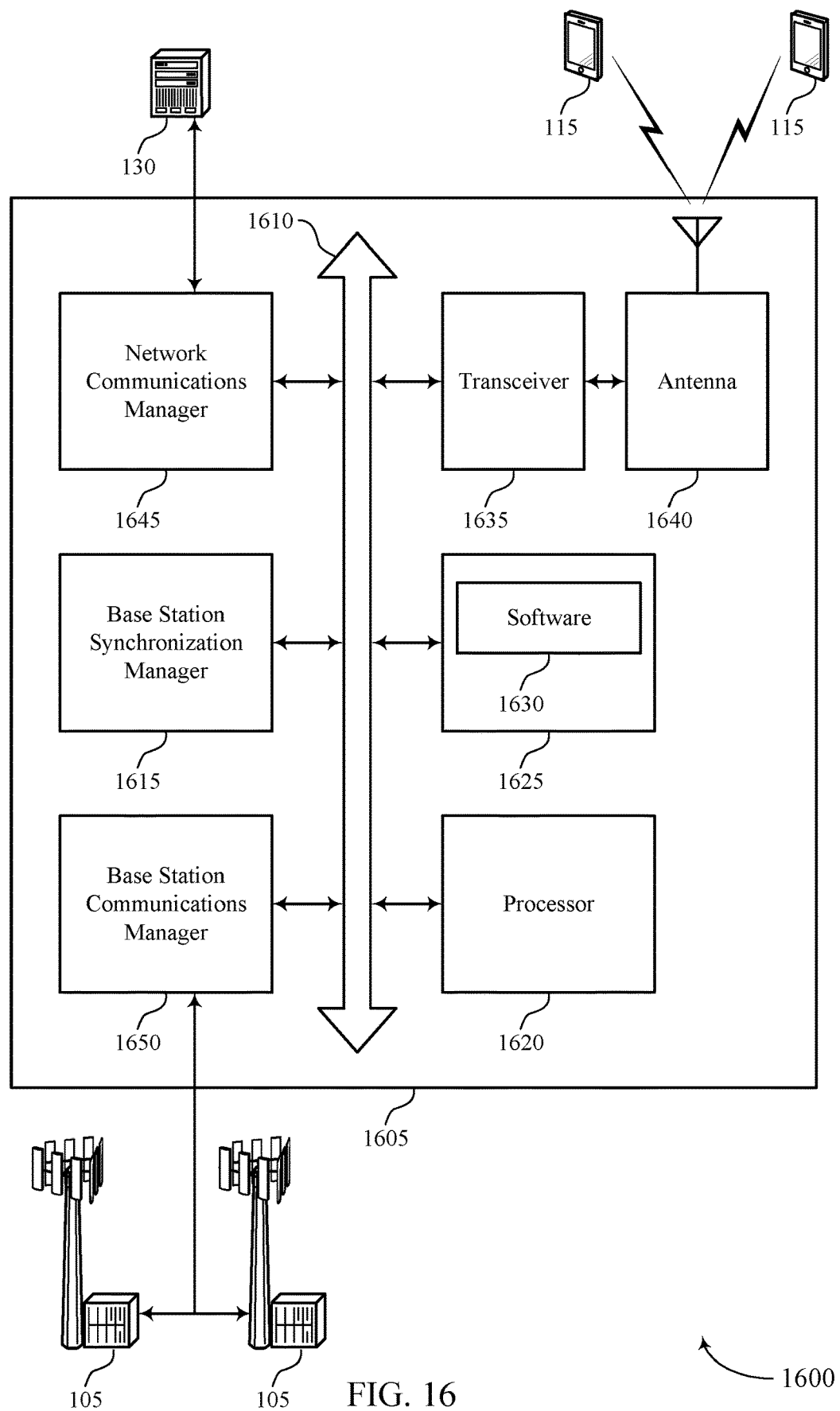
FIG. 16 illustrates a block diagram of a system including a base station that supports synchronization techniques using frequency hopping in unlicensed radio frequency spectrum in accordance with aspects of the present disclosure.

FIG. 16 shows a diagram of a system 1600 including a device 1605 that supports synchronization techniques using frequency hopping in unlicensed radio frequency spectrum in accordance with various aspects of the present disclosure. Device 1605 may be an example of or include the components of base station 105 as described above, e.g., with reference to FIG. 1. Device 1605 may include components for bi-directional voice and data communications including components for transmitting and receiving communications, including base station synchronization manager 1615, processor 1620, memory 1625, software 1630, transceiver 1635, antenna 1640, network communications manager 1645, and base station communications manager 1650. These components may be in electronic communication via one or more busses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting synchronization techniques using frequency hopping in unlicensed radio frequency spectrum).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support synchronization techniques using frequency hopping in unlicensed radio frequency spectrum. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Base station communications manager 1650 may manage communications with other base station 105, and may include a controller or scheduler for controlling communications with UEs 115 in cooperation with other base stations 105. For example, the base station communications manager 1650 may coordinate scheduling for transmissions to UEs 115 for various interference mitigation techniques such as beamforming or joint transmission. In some examples, base station communications manager 1650 may provide an X2 interface within an LTE/LTE-A wireless communication network technology to provide communication between base stations 105.

Figure 17:
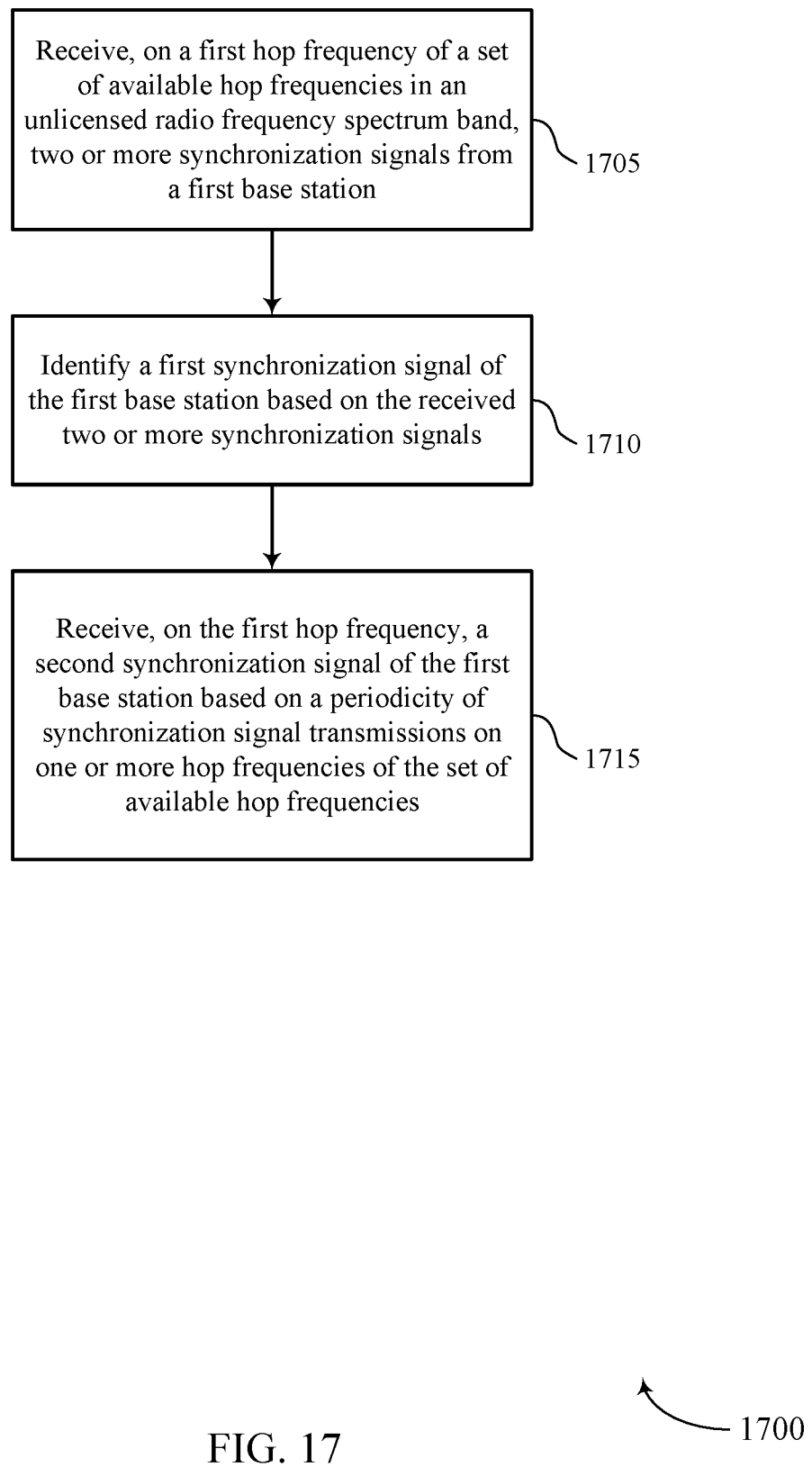
FIGS. 17 through 21 illustrate methods for synchronization techniques using frequency hopping in unlicensed radio frequency spectrum in accordance with aspects of the present disclosure.

FIG. 17 shows a flowchart illustrating a method 1700 for synchronization techniques using frequency hopping in unlicensed radio frequency spectrum in accordance with various aspects of the present disclosure. The operations of method 1700 may be implemented by a UE 115 or its components as described herein. For example, the operations of method 1700 may be performed by a UE synchronization manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive, on a first hop frequency of a plurality of available hop frequencies in an unlicensed radio frequency spectrum band, two or more synchronization signals from a first base station. The operations of block 1705 may be performed according to the methods described with reference to FIGS. 1 through 8. In certain examples, aspects of the operations of block 1705 may be performed by a synchronization signal receiver as described with reference to FIGS. 9 through 12.

At block 1710 the UE 115 may identify a first synchronization signal of the first base station based at least in part on the received two or more synchronization signals. The operations of block 1710 may be performed according to the methods described with reference to FIGS. 1 through 8. In certain examples, aspects of the operations of block 1710 may be performed by a synchronization identification component as described with reference to FIGS. 9 through 12.

At block 1715 the UE 115 may receive, on the first hop frequency, a second synchronization signal of the first base station based at least in part on a periodicity of synchronization signal transmissions on one or more hop frequencies of the plurality of available hop frequencies. The operations of block 1715 may be performed according to the methods described with reference to FIGS. 1 through 8. In certain examples, aspects of the operations of block 1715 may be performed by a synchronization signal receiver as described with reference to FIGS. 9 through 12.

Figure 18:
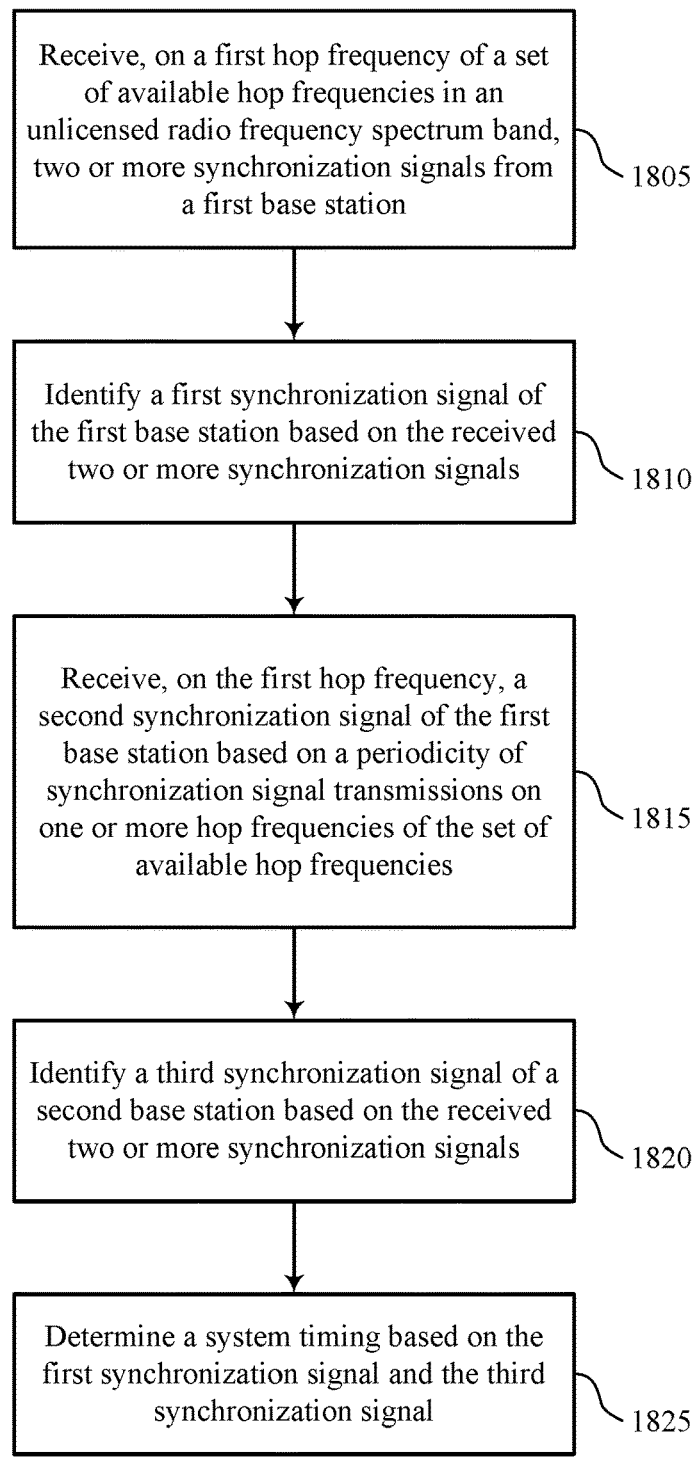

FIG. 18 shows a flowchart illustrating a method 1800 for synchronization techniques using frequency hopping in unlicensed radio frequency spectrum in accordance with various aspects of the present disclosure. The operations of method 1800 may be implemented by a UE 115 or its components as described herein. For example, the operations of method 1800 may be performed by a UE synchronization manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive, on a first hop frequency of a plurality of available hop frequencies in an unlicensed radio frequency spectrum band, two or more synchronization signals from a first base station. The operations of block 1805 may be performed according to the methods described with reference to FIGS. 1 through 8. In certain examples, aspects of the operations of block 1805 may be performed by a synchronization signal receiver as described with reference to FIGS. 9 through 12.

At block 1810 the UE 115 may identify a first synchronization signal of the first base station based at least in part on the received two or more synchronization signals. The operations of block 1810 may be performed according to the methods described with reference to FIGS. 1 through 8. In certain examples, aspects of the operations of block 1810 may be performed by a synchronization identification component as described with reference to FIGS. 9 through 12.

At block 1815 the UE 115 may receive, on the first hop frequency, a second synchronization signal of the first base station based at least in part on a periodicity of synchronization signal transmissions on one or more hop frequencies of the plurality of available hop frequencies. The operations of block 1815 may be performed according to the methods described with reference to FIGS. 1 through 8. In certain examples, aspects of the operations of block 1815 may be performed by a synchronization signal receiver as described with reference to FIGS. 9 through 12.

At block 1820 the UE 115 may identify a third synchronization signal of a second base station based at least in part on the received two or more synchronization signals. The operations of block 1820 may be performed according to the methods described with reference to FIGS. 1 through 8. In certain examples, aspects of the operations of block 1820 may be performed by a synchronization identification component as described with reference to FIGS. 9 through 12.

At block 1825 the UE 115 may determine a system timing based at least in part on the first synchronization signal and the third synchronization signal. The operations of block 1825 may be performed according to the methods described with reference to FIGS. 1 through 8. In certain examples, aspects of the operations of block 1825 may be performed by a timing component as described with reference to FIGS. 9 through 12.

Figure 19:
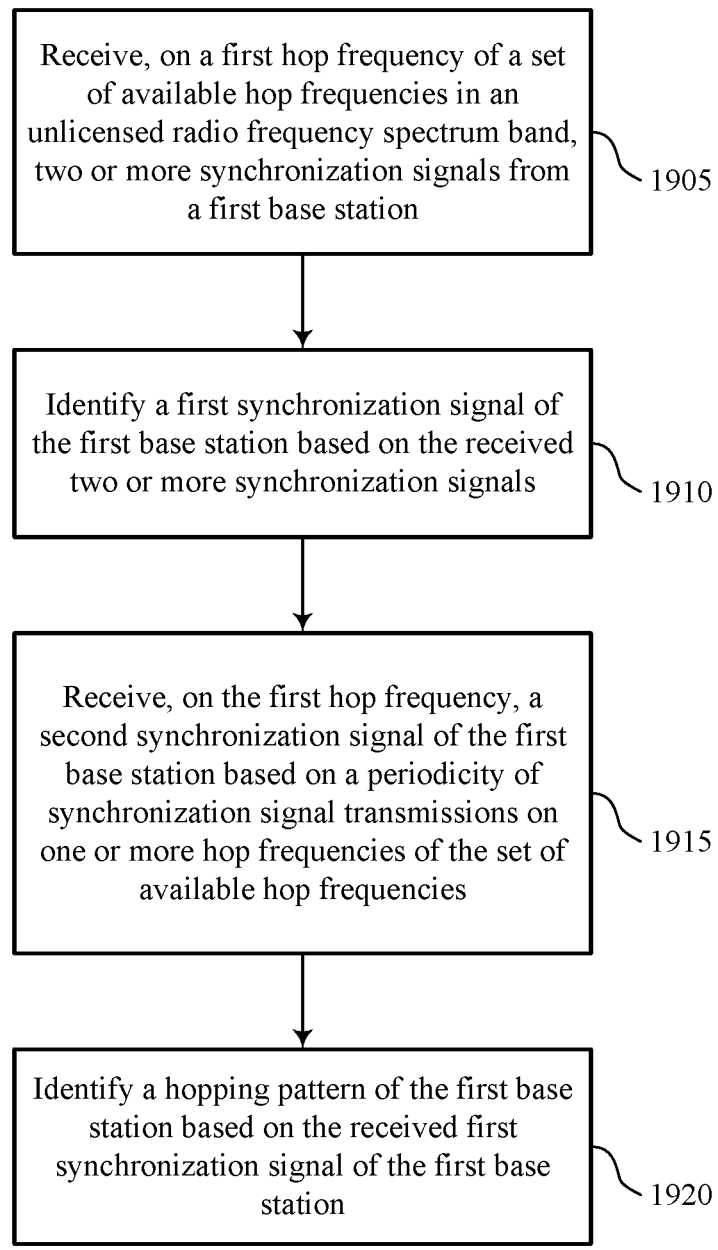

FIG. 19 shows a flowchart illustrating a method 1900 for synchronization techniques using frequency hopping in unlicensed radio frequency spectrum in accordance with various aspects of the present disclosure. The operations of method 1900 may be implemented by a UE 115 or its components as described herein. For example, the operations of method 1900 may be performed by a UE synchronization manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive, on a first hop frequency of a plurality of available hop frequencies in an unlicensed radio frequency spectrum band, two or more synchronization signals from a first base station. The operations of block 1905 may be performed according to the methods described with reference to FIGS. 1 through 8. In certain examples, aspects of the operations of block 1905 may be performed by a synchronization signal receiver as described with reference to FIGS. 9 through 12.

At block 1910 the UE 115 may identify a first synchronization signal of the first base station based at least in part on the received two or more synchronization signals. The operations of block 1910 may be performed according to the methods described with reference to FIGS. 1 through 8. In certain examples, aspects of the operations of block 1910 may be performed by a synchronization identification component as described with reference to FIGS. 9 through 12.

At block 1915 the UE 115 may receive, on the first hop frequency, a second synchronization signal of the first base station based at least in part on a periodicity of synchronization signal transmissions on one or more hop frequencies of the plurality of available hop frequencies. The operations of block 1915 may be performed according to the methods described with reference to FIGS. 1 through 8. In certain examples, aspects of the operations of block 1915 may be performed by a synchronization signal receiver as described with reference to FIGS. 9 through 12.

At block 1920 the UE 115 may identify a hopping pattern of the first base station based at least in part on the received first synchronization signal of the first base station. The operations of block 1920 may be performed according to the methods described with reference to FIGS. 1 through 8. In certain examples, aspects of the operations of block 1920 may be performed by a hopping pattern identification component as described with reference to FIGS. 9 through 12.

Figure 20:
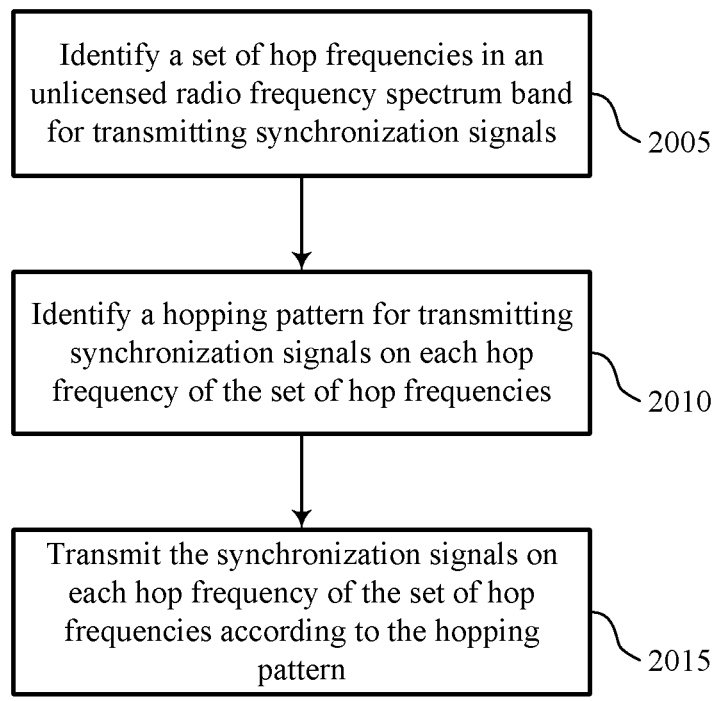

FIG. 20 shows a flowchart illustrating a method 2000 for synchronization techniques using frequency hopping in unlicensed radio frequency spectrum in accordance with various aspects of the present disclosure. The operations of method 2000 may be implemented by a base station 105 or its components as described herein. For example, the operations of method 2000 may be performed by a base station synchronization manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may identify a set of hop frequencies in an unlicensed radio frequency spectrum band for transmitting synchronization signals. The operations of block 2005 may be performed according to the methods described with reference to FIGS. 1 through 8. In certain examples, aspects of the operations of block 2005 may be performed by a hopping frequency identification component as described with reference to FIGS. 13 through 16.

At block 2010 the base station 105 may identify a hopping pattern for transmitting synchronization signals on each hop frequency of the set of hop frequencies. The operations of block 2010 may be performed according to the methods described with reference to FIGS. 1 through 8. In certain examples, aspects of the operations of block 2010 may be performed by a hopping pattern identification component as described with reference to FIGS. 13 through 16.

At block 2015 the base station 105 may transmit the synchronization signals on each hop frequency of the set of hop frequencies according to the hopping pattern. The operations of block 2015 may be performed according to the methods described with reference to FIGS. 1 through 8. In certain examples, aspects of the operations of block 2015 may be performed by a synchronization signal generator as described with reference to FIGS. 13 through 16.

Figure 21:
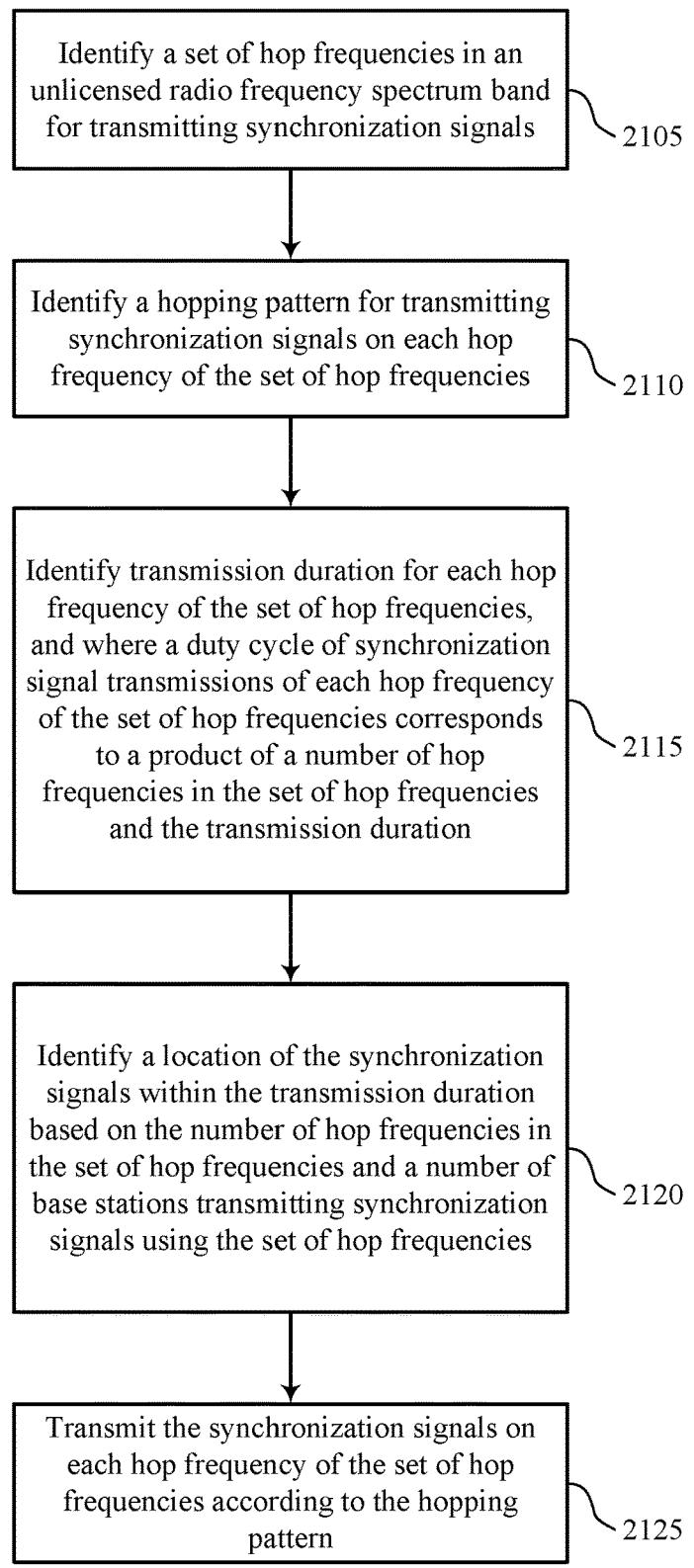

FIG. 21 shows a flowchart illustrating a method 2100 for synchronization techniques using frequency hopping in unlicensed radio frequency spectrum in accordance with various aspects of the present disclosure. The operations of method 2100 may be implemented by a base station 105 or its components as described herein. For example, the operations of method 2100 may be performed by a base station synchronization manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may identify a set of hop frequencies in an unlicensed radio frequency spectrum band for transmitting synchronization signals. The operations of block 2105 may be performed according to the methods described with reference to FIGS. 1 through 8. In certain examples, aspects of the operations of block 2105 may be performed by a hopping frequency identification component as described with reference to FIGS. 13 through 16.

At block 2110 the base station 105 may identify a hopping pattern for transmitting synchronization signals on each hop frequency of the set of hop frequencies. The operations of block 2110 may be performed according to the methods described with reference to FIGS. 1 through 8. In certain examples, aspects of the operations of block 2110 may be performed by a hopping pattern identification component as described with reference to FIGS. 13 through 16.

At block 2115 the base station 105 may identify transmission duration for each hop frequency of the set of hop frequencies, and wherein a duty cycle of synchronization signal transmissions of each hop frequency of the set of hop frequencies corresponds to a product of a number of hop frequencies in the set of hop frequencies and the transmission duration. The operations of block 2115 may be performed according to the methods described with reference to FIGS. 1 through 8. In certain examples, aspects of the operations of block 2115 may be performed by a hopping pattern identification component as described with reference to FIGS. 13 through 16.

At block 2120 the base station 105 may identify a location of the synchronization signals within the transmission duration based at least in part on the number of hop frequencies in the set of hop frequencies and a number of base stations transmitting synchronization signals using the set of hop frequencies. The operations of block 2120 may be performed according to the methods described with reference to FIGS. 1 through 8. In certain examples, aspects of the operations of block 2120 may be performed by a synchronization signal generator as described with reference to FIGS. 13 through 16.

At block 2125 the base station 105 may transmit the synchronization signals on each hop frequency of the set of hop frequencies according to the hopping pattern. The operations of block 2125 may be performed according to the methods described with reference to FIGS. 1 through 8. In certain examples, aspects of the operations of block 2125 may be performed by a synchronization signal generator as described with reference to FIGS. 13 through 16.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1x EV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, on a first hop frequency of a plurality of available hop frequencies in an unlicensed radio frequency spectrum band, two or more synchronization signals from a first base station;
   identifying a first synchronization signal of the first base station based at least in part on the received two or more synchronization signals;
   identifying, on the first hop frequency, a second synchronization signal of the first base station based at least in part on a periodicity of synchronization signal transmissions on one or more hop frequencies of the plurality of available hop frequencies; and
   identifying a hopping pattern of the first base station based at least in part on the received first synchronization signal and a physical channel signal of the first base station.

2. The method of claim 1, wherein:
   the hopping pattern is identified based at least in part on a number of hop frequencies of the plurality of available hop frequencies and a duration of transmissions of the first base station on each of the plurality of available hop frequencies.

3. The method of claim 2, wherein:
   the number of hop frequencies is determined based at least in part on a configured bandwidth of the unlicensed radio frequency spectrum band.

4. The method of claim 2, wherein:
   the number of hop frequencies is determined based at least in part on a signaled raster of hop frequencies from a base station.

5. The method of claim 2, wherein:
   the periodicity of synchronization signal transmissions on the first hop frequency is determined based at least in part on the number of hop frequencies and the duration of transmissions.

6. A method for wireless communication, comprising:
   receiving, on a first hop frequency of a plurality of available hop frequencies in an unlicensed radio frequency spectrum band, two or more synchronization signals from a first base station;
   identifying a first synchronization signal of the first base station based at least in part on the received two or more synchronization signals;
   identifying, on the first hop frequency, a second synchronization signal of the first base station based at least in part on a periodicity of synchronization signal transmissions on one or more hop frequencies of the plurality of available hop frequencies;
   identifying a third synchronization signal of a second base station based at least in part on the received two or more synchronization signals; and
   determining a system timing based at least in part on the first synchronization signal and the third synchronization signal.

7. A method for wireless communication, comprising:
   receiving, on a first hop frequency of a plurality of available hop frequencies in an unlicensed radio frequency spectrum band, two or more synchronization signals from a first base station;
   identifying a first synchronization signal of the first base station based at least in part on the received two or more synchronization signals;
   identifying a periodicity of synchronization signal transmissions based on a duty cycle for synchronization signal transmissions on at least a subset of the plurality of available hop frequencies; and
   identifying, on the first hop frequency, a second synchronization signal of the first base station based at least in part on the periodicity of synchronization signal transmissions.

8. The method of claim 7, wherein:
   the subset of the plurality of available hop frequencies comprise a first subset of identified hop frequencies of the plurality of available hop frequencies.

9. The method of claim 8, wherein:
   the first subset of identified hop frequencies comprise a static list of hop frequencies.

10. The method of claim 8, wherein:
    the first subset of identified hop frequencies are identified center frequencies of a raster of center frequencies of the plurality of available hop frequencies.

11. An apparatus for wireless communication, comprising:
- a processor;
- memory coupled with the processor; and
- instructions stored in the memory and executable by the processor to cause the apparatus to:
- receive, on a first hop frequency of a plurality of available hop frequencies in an unlicensed radio frequency spectrum band, two or more synchronization signals from a first base station;
- identify a first synchronization signal of the first base station based at least in part on the received two or more synchronization signals;
- identify, on the first hop frequency, a second synchronization signal of the first base station based at least in part on a periodicity of synchronization signal transmissions on one or more hop frequencies of the plurality of available hop frequencies; and
- identify a hopping pattern of the first base station based at least in part on the received first synchronization signal and a physical channel signal of the first base station.

12. The apparatus of claim 11, wherein the hopping pattern is identified based at least in part on a number of hop frequencies of the plurality of available hop frequencies and a duration of transmissions of the first base station on each of the plurality of available hop frequencies.

13. The apparatus of claim 12, wherein the number of hop frequencies is determined based at least in part on a configured bandwidth of the unlicensed radio frequency spectrum band.

14. The apparatus of claim 12, wherein the number of hop frequencies is determined based at least in part on a signaled raster of hop frequencies from a base station.

15. The apparatus of claim 12, wherein the periodicity of synchronization signal transmissions on the first hop frequency is determined based at least in part on the number of hop frequencies and the duration of transmissions.

16. An apparatus for wireless communication, comprising:
- a processor;
- memory coupled with the processor; and
- instructions stored in the memory and executable by the processor to cause the apparatus to:
- receive, on a first hop frequency of a plurality of available hop frequencies in an unlicensed radio frequency spectrum band, two or more synchronization signals from a first base station;
- identify a first synchronization signal of the first base station based at least in part on the received two or more synchronization signals;
- identify a periodicity of synchronization signal transmissions based on a duty cycle for synchronization signal transmissions on at least a subset of the plurality of available hop frequencies; and
- identify, on the first hop frequency, a second synchronization signal of the first base station based at least in part on the periodicity of synchronization signal transmissions.

17. The apparatus of claim 16, wherein the subset of the plurality of available hop frequencies comprise a first subset of identified hop frequencies of the plurality of available hop frequencies.

18. The apparatus of claim 17, wherein the first subset of identified hop frequencies comprise a static list of hop frequencies.

19. The apparatus of claim 17, wherein the first subset of identified hop frequencies are identified center frequencies of a raster of center frequencies of the plurality of available hop frequencies.

20. An apparatus for wireless communication, comprising:
- a processor;
- memory coupled with the processor; and
- instructions stored in the memory and executable by the processor to cause the apparatus to:
- receive, on a first hop frequency of a plurality of available hop frequencies in an unlicensed radio frequency spectrum band, two or more synchronization signals from a first base station;
- identify a first synchronization signal of the first base station based at least in part on the received two or more synchronization signals;
- identify, on the first hop frequency, a second synchronization signal of the first base station based at least in part on a periodicity of synchronization signal transmissions on one or more hop frequencies of the plurality of available hop frequencies;
- identify a third synchronization signal of a second base station based at least in part on the received two or more synchronization signals; and
- determine a system timing based at least in part on the first synchronization signal and the third synchronization signal.

* * * * *